(12) United States Patent
Quigley et al.

(10) Patent No.: US 8,209,733 B2
(45) Date of Patent: Jun. 26, 2012

(54) EDGE DEVICE THAT ENABLES EFFICIENT DELIVERY OF VIDEO TO HANDHELD DEVICE

(75) Inventors: Thomas J. Quigley, Franklin, NC (US); Jeyhan Karaoguz, Irvine, CA (US); Sherman (Xuemin) Chen, San Diego, CA (US); Michael Dove, Los Gatos, CA (US); David Rosmann, Irvine, CA (US); Stephen E. Gordon, Lexington, MA (US)

(73) Assignee: Broadcom Corporation, Irvine, CA (US)

( * ) Notice: Subject to any disclaimer, the term of this patent is extended or adjusted under 35 U.S.C. 154(b) by 860 days.

(21) Appl. No.: 12/172,088

(22) Filed: Jul. 11, 2008

(65) Prior Publication Data

US 2009/0300698 A1    Dec. 3, 2009

Related U.S. Application Data

(60) Provisional application No. 61/056,547, filed on May 28, 2008.

(51) Int. Cl.
*H04N 7/173* (2011.01)
(52) U.S. Cl. ................ 725/114; 375/240.01
(58) Field of Classification Search .............. None
See application file for complete search history.

(56) References Cited

U.S. PATENT DOCUMENTS

| | | | | |
|---|---|---|---|---|
| 5,612,981 | A * | 3/1997 | Huizer | 375/376 |
| 6,519,011 | B1 * | 2/2003 | Shendar | 348/731 |
| 7,339,993 | B1 * | 3/2008 | Brooks et al. | 375/240.26 |
| 8,005,316 | B1 * | 8/2011 | Linburn et al. | 382/283 |
| 2003/0142213 | A1 * | 7/2003 | Ali et al. | 348/180 |
| 2004/0045030 | A1 | 3/2004 | Reynolds | |
| 2004/0179605 | A1 | 9/2004 | Lane | |
| 2004/0226045 | A1 | 11/2004 | Nadarajah | |
| 2005/0074061 | A1 * | 4/2005 | Ribas-Corbera et al. | 375/240.01 |

(Continued)

FOREIGN PATENT DOCUMENTS

EP    1052851 A1    11/2000

(Continued)

OTHER PUBLICATIONS

European Search Report: EP Application No. 09006468.4-1247; dated Sep. 2, 2009.
European Search Report for EP Application No./Patent No. 09006468.4-1247, dated Sep. 30, 2011, 4 pages.

*Primary Examiner* — Thai Tran
*Assistant Examiner* — Sunghyoun Park
(74) *Attorney, Agent, or Firm* — Garlick & Markison; Bruce E. Garlick; Jessica W. Smith

(57) ABSTRACT

A video processing system includes a communications interface and video processing circuitry. The communications interface receives video data from a video source, receives at least one operating parameter regarding a remote wireless device, and transmits an output video stream to the remote wireless device. The video processing circuitry couples to the communications interface, receives the video data and the at least one operating parameter, determines video processing parameters based upon the video data and the at least one operating parameter, processes the video data based upon the video processing parameters to produce the output video stream, and provides the output video stream to the communications interface for transmission to the remote wireless device. The video data (incoming video stream) may be processed by altering a frame rate, PCRs, pixel resolution, color resolution, color content, and/or region of interest content of the incoming video data to produce the output video stream.

21 Claims, 16 Drawing Sheets

U.S. PATENT DOCUMENTS

| | | |
|---|---|---|
| 2005/0190872 A1 | 9/2005 | Seong |
| 2006/0202893 A1* | 9/2006 | Goldberg et al. ............. 342/378 |
| 2007/0061862 A1 | 3/2007 | Berger |
| 2009/0041155 A1 | 2/2009 | Sugai et al. |
| 2009/0251594 A1* | 10/2009 | Hua et al. ..................... 348/441 |

FOREIGN PATENT DOCUMENTS

| | | |
|---|---|---|
| WO | 200065837 A1 | 11/2000 |
| WO | 2007035151 A1 | 3/2007 |
| WO | 2007144682 | 12/2007 |

* cited by examiner

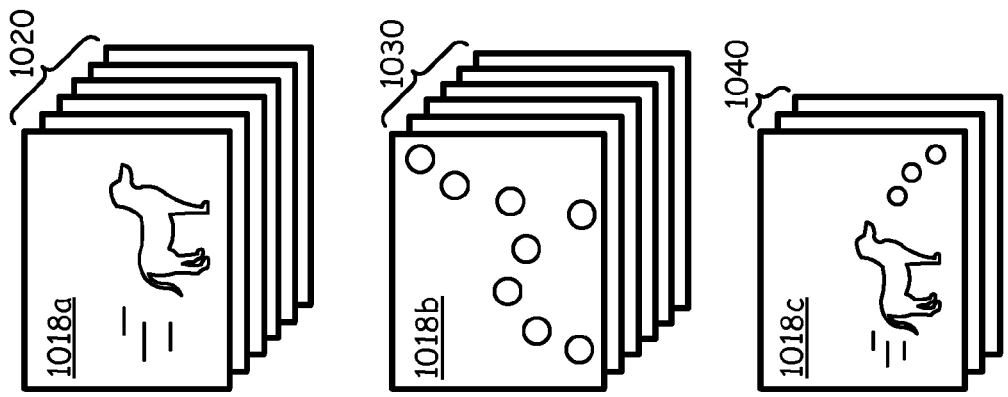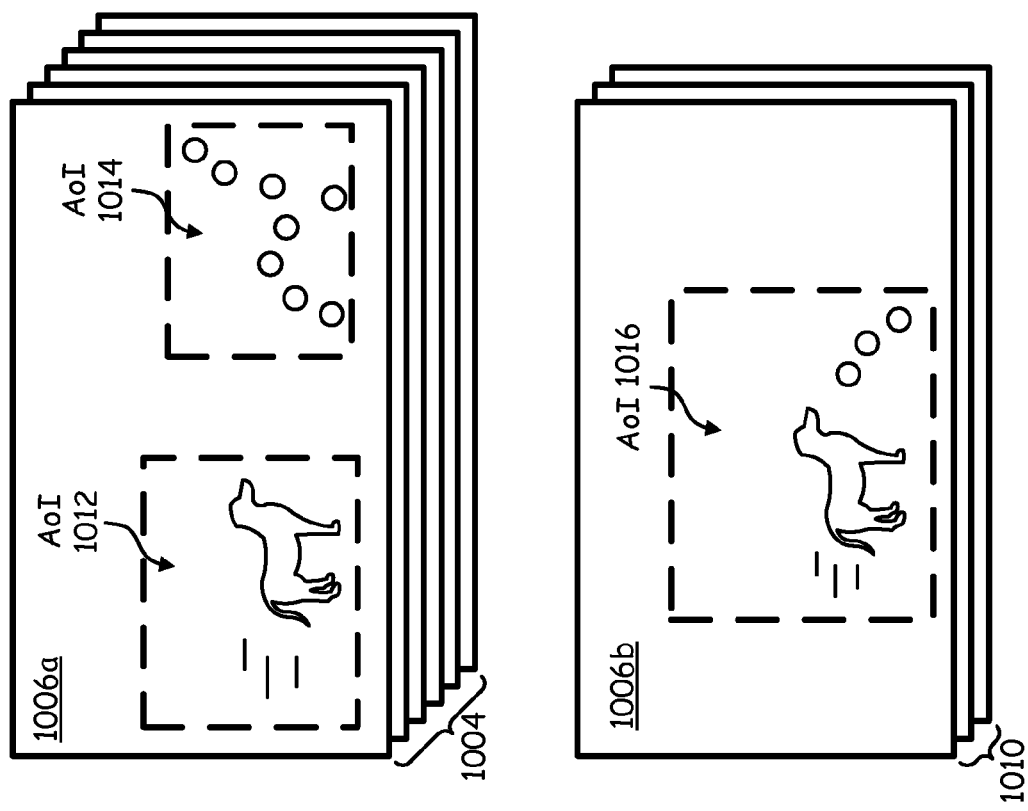
FIG. 10

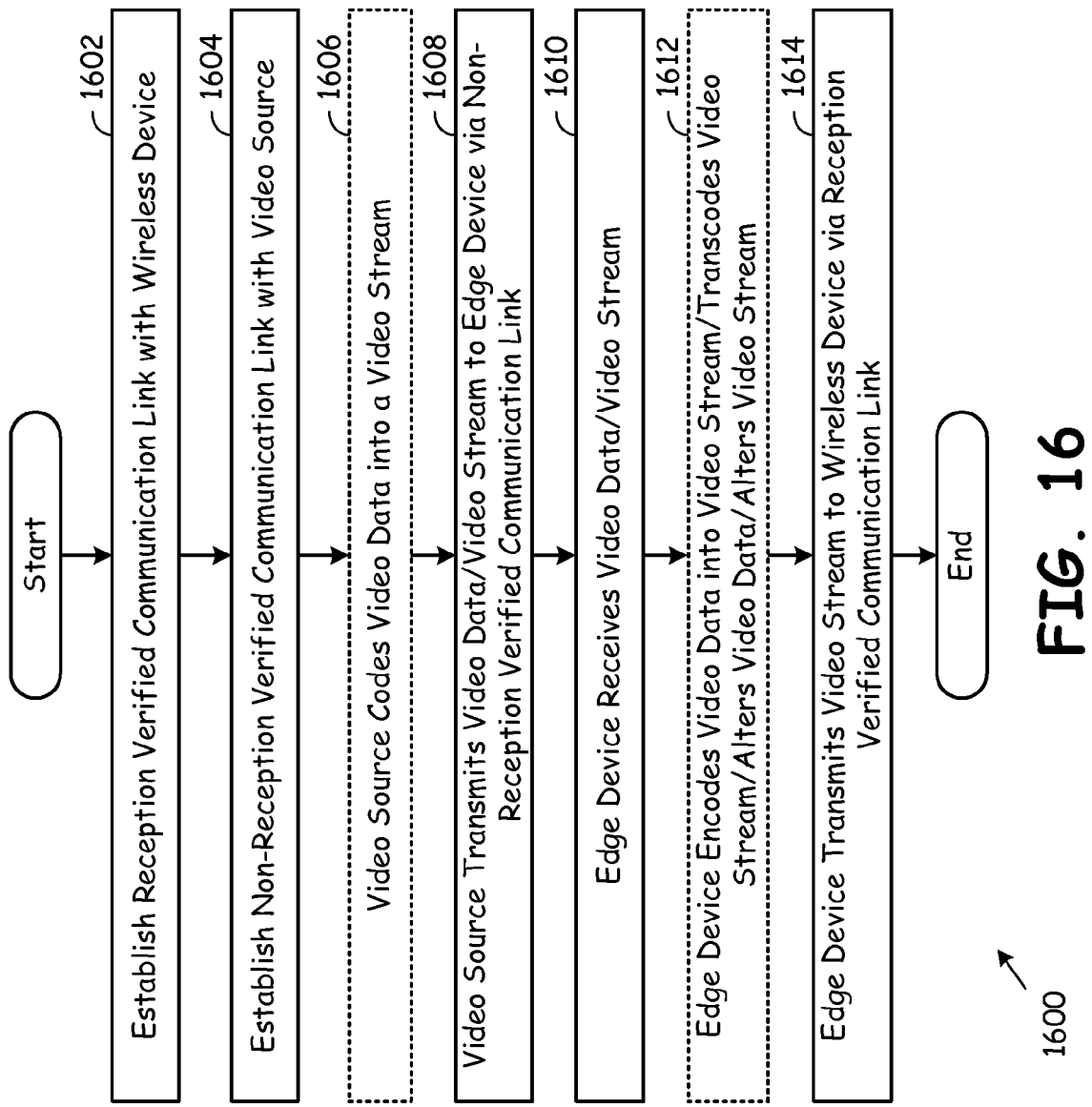

EDGE DEVICE THAT ENABLES EFFICIENT DELIVERY OF VIDEO TO HANDHELD DEVICE

CROSS-REFERENCE TO RELATED APPLICATIONS

The present U.S. Utility patent application claims priority pursuant to 35 U.S.C. §119(e) to U.S. Provisional Application Ser. No. 61/056,547, entitled EDGE DEVICE THAT ENABLES EFFICIENT DELIVERY OF VIDEO TO HANDHELD DEVICE, filed on May 28, 2008.

The present application is related to the following US patent applications:

EDGE DEVICE RECEPTION VERIFICATION/NON-RECEPTION VERIFICATION LINKS TO DIFFERING DEVICES, having a U.S. application Ser. No. 12/172,130, filed on Jul. 11, 2008; and EDGE DEVICE ESTABLISHING AND ADJUSTING WIRELESS LINK PARAMETERS IN ACCORDANCE WITH QOS-DESIRED VIDEO DATA RATE, having U.S. application Ser. No. 12/188,666, filed on Aug. 8, 2008.

BACKGROUND

1. Technical Field of the Invention

This invention relates generally to video/audio content transport, and more particularly to the preparation, transportation, and receipt of such video/audio content.

2. Related Art

The broadcast of digitized video/audio information (multimedia content) is well known. Limited access communication networks such as cable television systems, satellite television systems, and direct broadcast television systems support delivery of digitized multimedia content via controlled transport medium. In the case of a cable modem system, a dedicated network that includes cable modem plant is carefully controlled by the cable system provider to ensure that the multimedia content is robustly delivered to subscribers' receivers. Likewise, with satellite television systems, dedicated wireless spectrum robustly carries the multi-media content to subscribers' receivers. Further, in direct broadcast television systems such as High Definition (HD) broadcast systems, dedicated wireless spectrum robustly delivers the multi-media content from a transmitting tower to receiving devices. Robust delivery, resulting in timely receipt of the multimedia content by a receiving device is critical for the quality of delivered video and audio.

Some of these limited access communication networks now support on-demand programming in which multimedia content is directed to one, or a relatively few number of receiving devices. The number of on-demand programs that can be serviced by each of these types of systems depends upon, among other things, the availability of data throughput between a multimedia source device and the one or more receiving devices. Generally, this on-demand programming is initiated by one or more subscribers and serviced only upon initiation.

Publicly accessible communication networks, e.g., Local Area Networks (LANs), Wireless Local Area Networks (WLANs), Wide Area Networks (WANs), Wireless Wide Area Networks (WWANs), and cellular telephone networks, have evolved to the point where they now are capable of providing data rates sufficient to service streamed multimedia content. The format of the streamed multimedia content is similar/same as that that is serviced by the limited access networks, e.g., cable networks, satellite networks. However, each of these communication networks is shared by many users that compete for available data throughput. Resultantly, streamed multimedia content is typically not given preferential treatment by these networks.

Generally, streamed multimedia content is formed/created by a first electronic device, e.g., web server, personal computer, user equipment, etc., transmitted across one or more communication networks, and received and processed by a second electronic device, e.g., personal computer, laptop computer, cellular telephone, WLAN device, or WWAN device. In creating the multimedia content, the first electronic device obtains/retrieves multimedia content from a video camera or from a storage device, for example, and encodes the multimedia content to create encoded audio and video frames according to a standard format, e.g., Quicktime, (motion picture expert group) MPEG-2, MPEG-4, or H.264, for example. The encoded audio and video frames are placed into data packets that are sequentially transmitted from the first electronic device onto a servicing communication network, the data packets addressed to one or more second electronic device(s). The sequentially transmitted sequence of encoded audio/video frames may be referred to as a video stream or an audio/video stream. One or more communication networks carry the data packets to the second electronic device. The second electronic device receives the data packets, reorders the data packets if required, and extracts the encoded audio and video frames from the data packets. A decoder of the second electronic device decodes the encoded audio and/or video frames to produce audio and video data. The second electronic device then stores the video/audio data and/or presents the video/audio data to a user via a user interface.

The audio/video stream may be carried by one or more of a number of differing types of communication networks, e.g., LANs, WANs, the Internet, WWANs, WLANs, cellular networks, etc. Some of these networks may not support the audio/video stream reliability and/or with sufficient data rate, resulting in poor quality audio/video at the second electronic device. Thus, a need exists for a structures and operations for the formation, transmission, and receipt of audio/video streams across such networks. Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

The present invention is directed to apparatus and methods of operation that are further described in the following Brief Description of the Drawings, the Detailed Description of the Drawings, and the claims. Other features and advantages of the present invention will become apparent from the following detailed description of the invention made with reference to the accompanying drawings.

BRIEF DESCRIPTION OF THE DRAWINGS

FIG. 10 is a diagram illustrating area of interest processing of video frames of a video stream according to one or more embodiments of the present invention;

FIG. 16 is a flow chart illustrating operations for reception verified/non-reception verified video data/stream transfer according to one or more embodiments of the present invention.

DETAILED DESCRIPTION OF THE DRAWINGS

Figure 1:
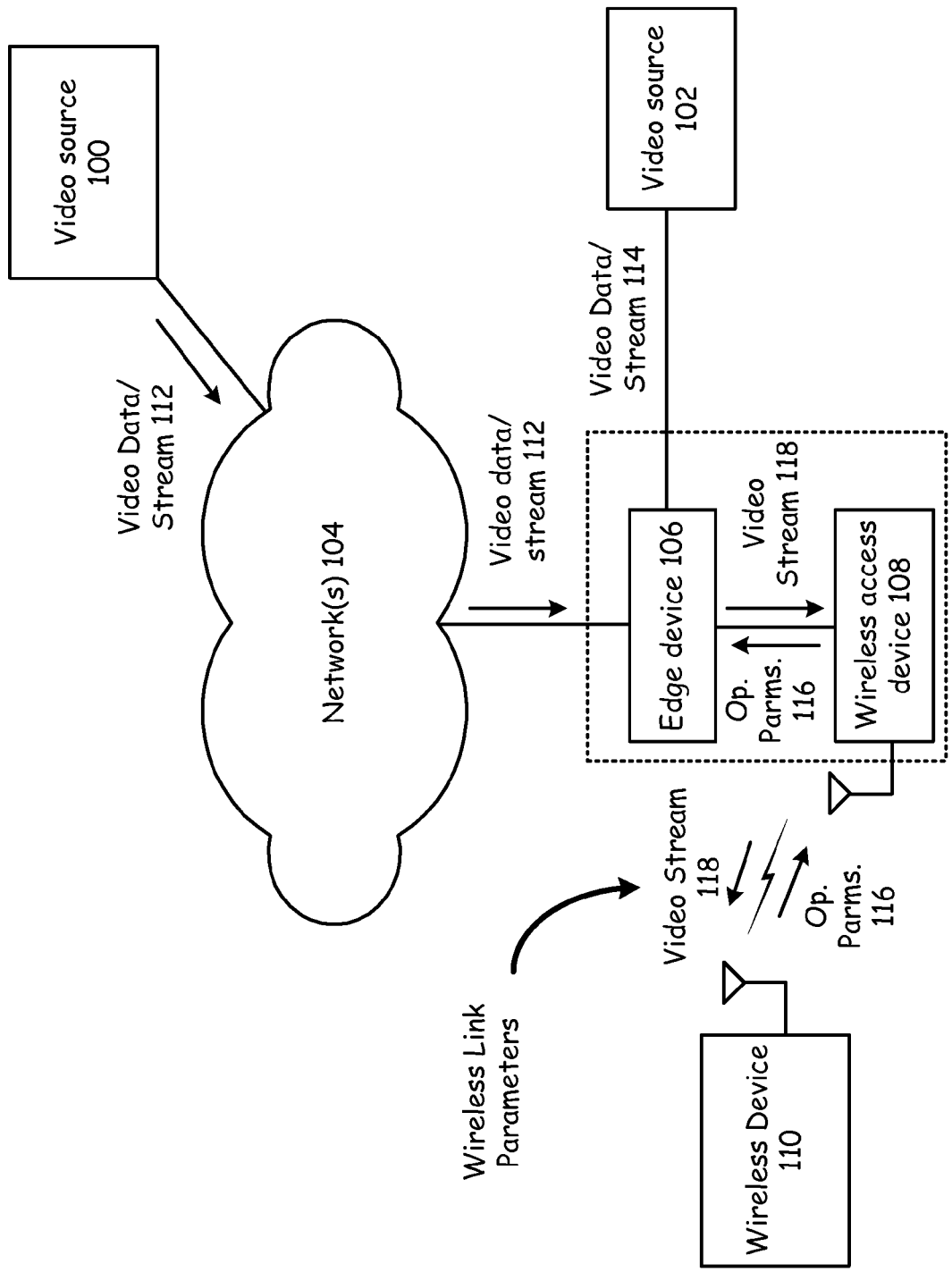
FIG. 1 is a partial system diagram illustrating a video processing system constructed and operating according to one or more embodiments of the present invention.

FIG. 1 is a partial system diagram illustrating a video processing system constructed and operating according to one or more embodiments of the present invention. Illustrated in FIG. 1 are video source 100, video source 102, network(s) 104, edge device 106, wireless access device 108, and a wireless device 110. The video sources 100 and 102 store video data in some embodiments, capture video data in some embodiments, and both store and capture video data in still other embodiments. Video sources 100 and 102 provide video data that is transported to wireless device 110 according to various operations and embodiments of the present invention. The video data may be transported in a block fashion or a video stream fashion. Thus, video data/video stream 112 is transferred from video source 100 to edge device 106 via network(s) 104 in either a block or a streamed fashion. Likewise, video data/video stream 114 is transferred from video source 102 to edge device 106 in a block fashion or a streamed fashion. Note that video source 102 couples directly to edge device 106 while video source 100 couples to edge device 106 via network(s) 104.

Network(s) 104 may include one or more Local Area Networks (LANs), one or more Wide Area Network (WANs), the Internet, and/or other types of wired networks. When the network(s) 104 include a wired network, the wired network may operate according to the one or more of the IEEE operating standards and/or other operating standards. Network(s) 104 may further include one or more wireless networks including one or more Wireless Wide Area Network (WWANs), one or more Wireless Local Area Networks (WLANs), and/or one or more cellular networks. When the network(s) 104 include WLANs, the WLANs may operate according to one or more of the IEEE 802.11x operating standards. When the network(s) 104 include a WWAN, the WWAN may operate according to the WiMAX operating standards.

The edge device 106 is also referred to herein interchangeably as a video processing system or a video processing device. One particular example of the structure of the edge device 106 will be described further herein with reference to FIG. 5. One particular structure of the wireless device 110 will be described further herein with reference to FIG. 4. The operations supported by edge device 106 solely or in combination with one or more other of the devices of FIG. 1 will be described further herein with reference to FIGS. 6-16.

The edge device 106 of FIG. 1 couples to wireless access device 108, which services a wireless link with wireless device 110. Wireless access device 108 and wireless device 110 support one or more wireless links according to one or more wireless interface standards. When this wireless interface is supported according to a WLAN operating standard, the operating standard may be consistent with one or more of the IEEE 802.11x operating standards. When the wireless link supported by a wireless access device 108 and wireless device 110 support WWAN operations, the wireless link may be established and supported according to the WiMAX operating standard. Further, the wireless link between the wireless access device 108 and wireless device 110 may be supported and operated according to one or more cellular network operating standards. These operating standards may include, for example, a TDMA standard such as one or more of the global standards for mobile communications (GSM) operating standards, one or more CDMA standards such as IS-95x, and/or one or other 2G or 2.5G standards. Further, the wireless link may be established according to one or more 3G, 4G, or subsequent operating standards that support high data transfer. These operating standards may be consistent with North American standards such as the 1XEV-DO or 1XEV-DV operating standards or with the 3G and 4G variants of the GSM operating standards. Further, other operating standards are supported according to the present invention.

Generally, according to a first broad aspect of embodiments of the present invention, the edge device 106 receives at least one operating parameter 116 regarding the remote wireless device 110. Based upon the at least one operating parameter 116 regarding the remote wireless device 110, the edge device 106 processes the video data/video stream 112 (or 114) to produce an output video stream 118 that is subsequently transmitted to the wireless device 110 by the wireless access device 108. Because the operating parameters 116 regarding the wireless device 110 change over time, the processing of the video data by edge device 106 may also change over time. Embodiments of this aspect of the present invention will be described further herein with reference to FIGS. 6-10.

According to a second broad aspect of embodiments of the present invention, the edge device 106 establishes a reception verified communication link with wireless device 110 and establishes a non-reception verified communication link with video source 100 or 102. In such case, the edge device receives video stream/video data 110 from video source 100 or 102 via the non-reception verified communication link. However, because the communication link between edge device 105 and the wireless device 110 is not as robust as the communication link between edge device 106 and the video source 100 or 102, the edge device 106 transmits the video stream 118 to the remote wireless device using the reception verified communication link. Embodiments of this aspect of the present invention will be described further with reference to FIGS. 14-16.

Further, according to a third broad aspect of the present invention, the edge device 106 is responsible for establishing a wireless link between the wireless access device 108 and the remote wireless device 110. In performing these operations, the edge device attempts to establish a wireless communication link with remote wireless device 110 in a fashion that is sufficient to support data throughput required by output video stream 118. Because the wireless link between the wireless access device 108 and 110 may change over time, the edge device 106 may process the video data/video stream 112 or 114 in a manner consistent with the then current characteristics of the wireless link between the wireless access device 108 and 110 to produce the output video stream 118. Further, due to changing characteristics of the video data/video stream 112 or 114, the edge device 106 may dynamically adjust characteristics of the wireless link between the wireless access device 108 and 110 so as to adequately service the output video stream 118 but not to overly burden the servicing wireless network corresponding to wireless access device 108. In such case, the edge device 106 is responsible for adaptively requesting wireless link parameters that support the transmission of output video stream 118 and also to process video data/video stream 112 or 114 in a manner to cause output video stream 118 to be adequately serviced by then current wireless link parameters. According to this aspect of the present invention, edge device 106 passes link control parameters to wireless access device 108/interfaces with wireless access device 108 to control wireless link parameters. Embodiments of this aspect of the present invention will be generally described further herein with reference to FIGS. 11-13.

Figure 2:
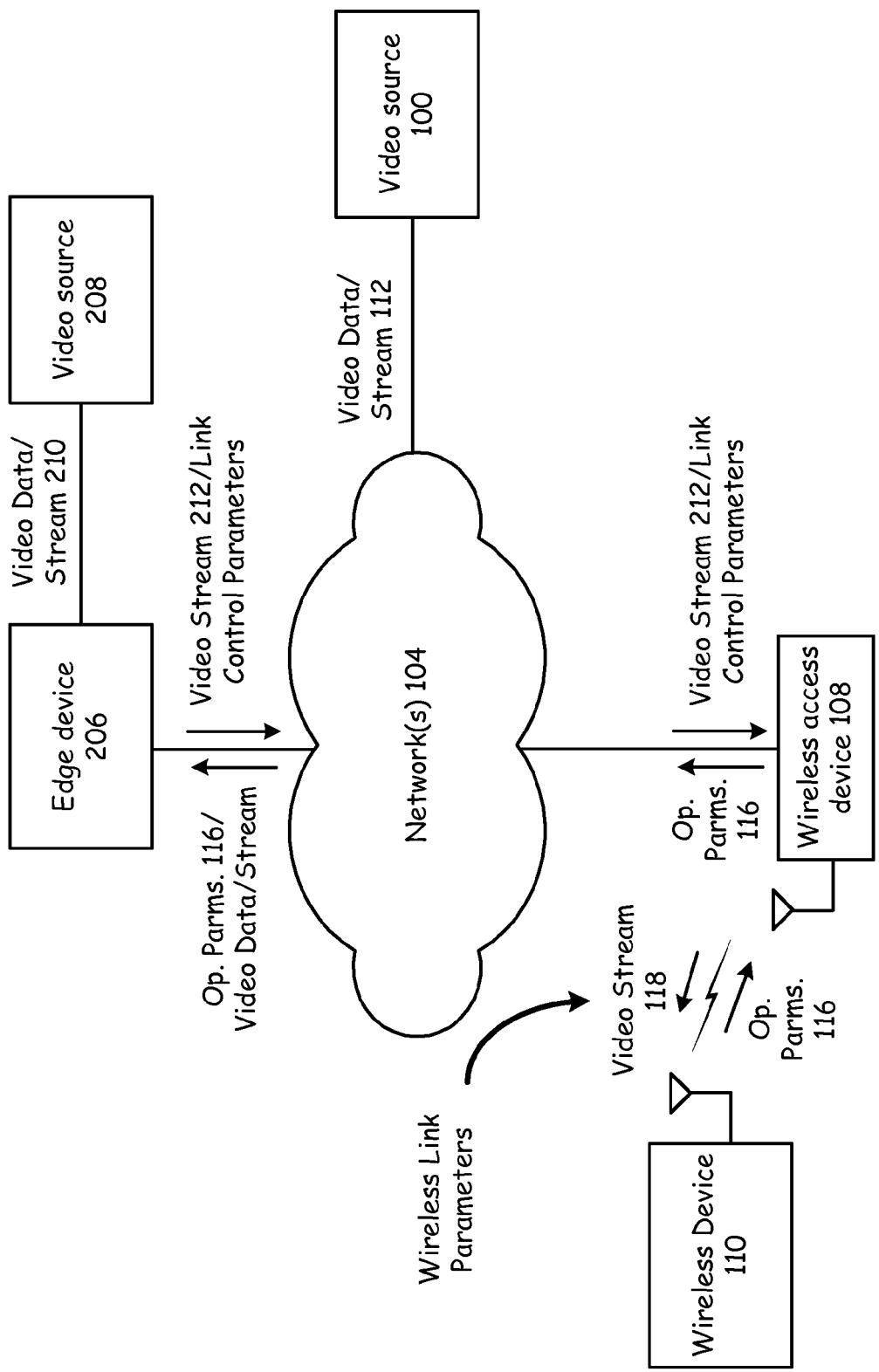
FIG. 2 is a partial system diagram illustrating another video processing system constructed and operating according to one or more embodiments of the present invention.

FIG. 2 is a partial system diagram illustrating another video processing system constructed and operating according to one or more embodiments of the present invention. As contrasted to the structure of FIG. 1, edge device 206 of FIG. 2 is not directly coupled to wireless access device 108. Instead, edge device 206 couples to wireless access device 108 via network(s) 104. Network(s) 104 may have structure consistent with the structure previously described for network(s) 104 with reference to FIG. 1. With the structure of FIG. 2, edge device 206 couples directly to video source 208 and directly receives video data/video stream 210 from video source 208. Further, edge device 206 couples indirectly to video source 100 via network(s) 104 and receives video data/video stream 112 from video source 100 via network(s) 104.

Wireless access device 108 services a wireless link with wireless device 110 and interfaces with edge device 106 via network(s) 104. The operations of the system of FIG. 2 are consistent with those previously described with reference to the system of FIG. 1. However, differentiated from the system of FIG. 1, with the system of FIG. 2, the edge device 206 transports video stream 212 to wireless access device 108 via network(s) 104. Further, edge device 206 receives the operating parameters 116 regarding the remote wireless device 110 via network(s) 104 and passes link control parameters to the wireless access device via the network(s). Other than these structural and operational differences between the systems of FIG. 2 and FIG. 1, the edge device 206 of FIG. 2 performs operations that are the same or similar to those previously described with reference to FIG. 1. Such same/similar operations will not be further described with reference to FIG. 2.

Figure 3:
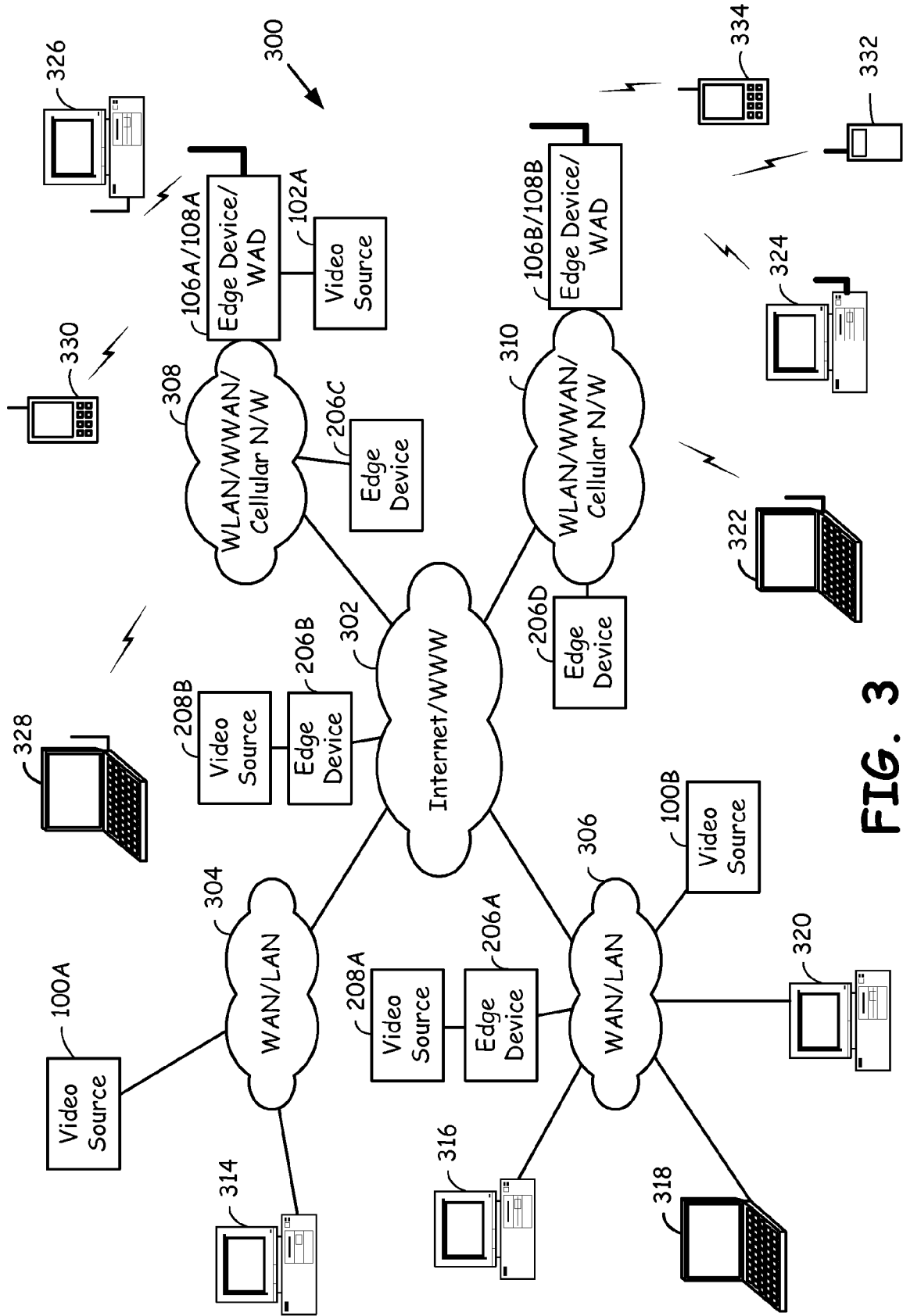
FIG. 3 is a system diagram illustrating a communication system that operates according to one or more embodiment of the present invention.

FIG. 3 is a system diagram illustrating a communication system that operates according to one or more embodiment of the present invention. The system 300 of FIG. 3 includes a plurality of communication networks 302, 304, 306, 308, and 310 that service a plurality of electronic devices 314, 316, 318, 320, 322, 324, 326, 328, 330, 332, and 334. These communication networks include the Internet/World Wide Web (WWW) 302, one or more Wide Area Networks/Local Area Networks (WANs/LANs) 304 and 306, and one or more Wireless Wide Area Networks/Wireless Local Area Networks/Cellular networks (WLANs/WWANs/Cellular networks) 308 and 310. The Internet/WWW 302 is generally known and supports Internet Protocol (IP) operations. The WANs/LANs 304 and 306 support electronic devices 314, 316, 318, and 320 and support IP operations. The WLANs/WWANs/Cellular networks 308 and 310 support wireless devices 322, 324, 326, 328, 330, 332, and 334.

The WLAN/WWAN/Cellular networks 308 and 310 operate according to one or more wireless interface standards, e.g., IEEE 802.11x, WiMAX, GSM, EDGE, GPRS, WCDMA, CDMA, 3xEV-DO, 3xEV-DV, etc. The WLAN/WWAN/Cellular networks 308 and 310 include a back-haul network that couples to the Internet/WWW 302 and service wireless links for wireless devices 322, 324, 326, 328, 330, 332, and 334. In providing this wireless service, the WLAN/WWAN/Cellular networks 308 and 310 include infrastructure devices, e.g., Access Points and base stations to wirelessly service the electronic devices 322, 324, 326, 328, 330, 332, and 334. The wireless links serviced by the WLAN/WWAN/Cellular networks 308 and 310 are shared amongst the wireless devices 324-334 and are generally data throughput limited. Such data throughput limitations result because the wireless links are shared, the wireless links are degraded by operating conditions, and/or simply because the wireless links have basic data throughput limitations.

According to operations of the system 300 of FIG. 3, any of the devices 314, 316, 318, 320, 322, 324, 326, 328, 330, 332, or 334 and the video sources 100A, 100B, 102A, 208A, and/or 208B may serve and operate as a video source as described with reference to FIGS. 1 and 2 and as will be further described with reference to FIGS. 4-16. Further each of the wireless devices 322, 324, 326, 328, 330, 332, of 334 may serve and operate as a remote wireless device as was described with reference to FIGS. 1 and 2 and as will be further described with reference to FIGS. 4-16. Moreover, each of edge devices 106A, 106B, 206A, 206B, 206C, and 206D may serve and operate as an edge device as was described with reference to FIGS. 1 and 2 and as will be further described with reference to FIGS. 4-16. Note that with the embodiments of FIG. 3, edge device 106A and wireless access device 108A are shown as a single block and edge device 106B and wireless access device 108B are shown as a single block. This indicated structure does not necessarily indicate that these devices share a physical structure, only that they are coupled functionally at the edge of networks 308 and 310, respectively.

Figure 4:
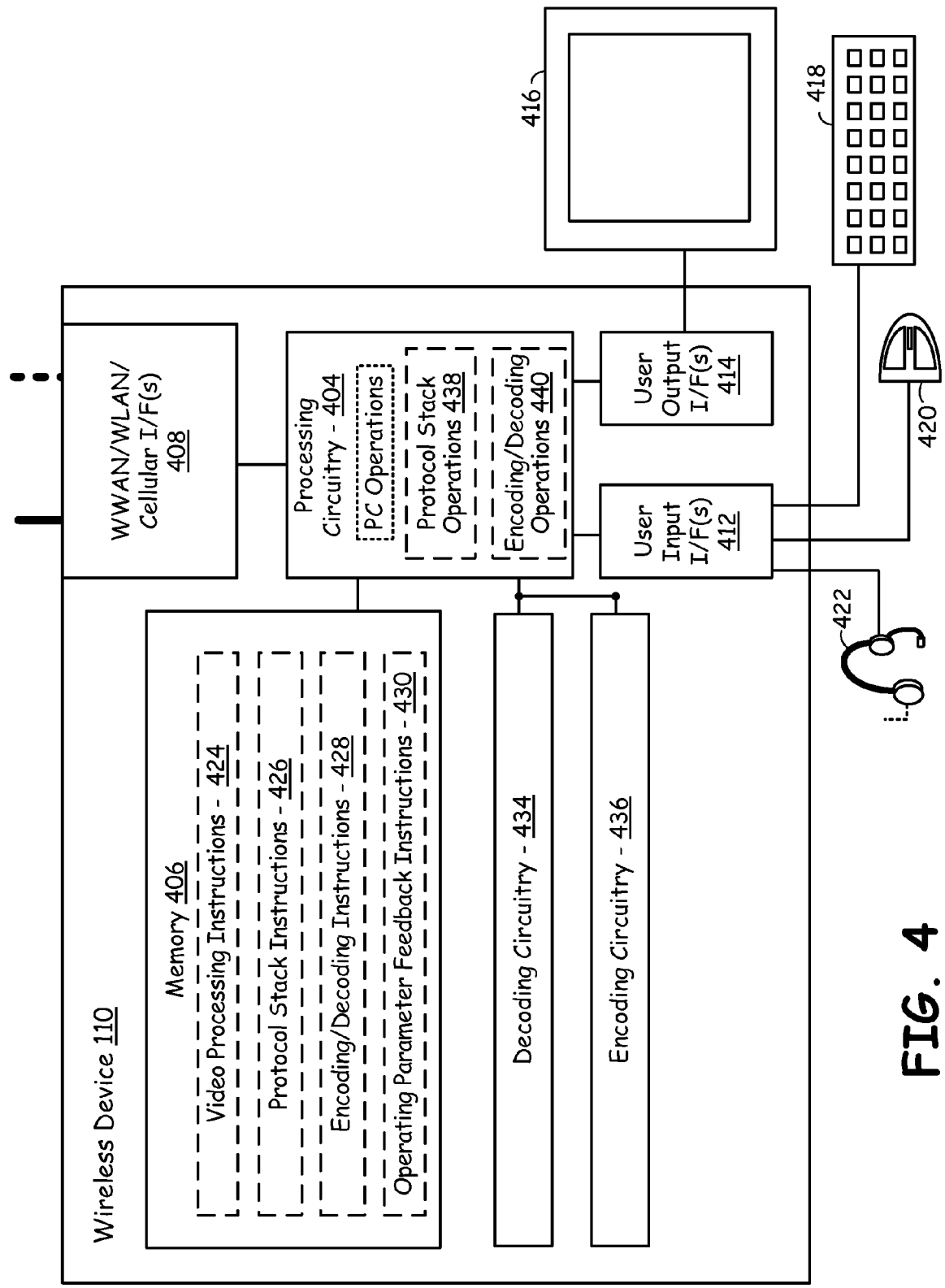
FIG. 4 is a block diagram illustrating a wireless device constructed and operating according to one or more embodiments of the present invention.

FIG. 4 is a block diagram illustrating a wireless device constructed and operating according to one or more embodiments of the present invention. The wireless device 110 is representative of an embodiment of wireless device 110 of FIGS. 1 and 2, for example. The components of wireless device 110 are generically illustrated. Particular embodiments of the wireless device 110 of FIG. 4 may include some, most, or all of the components that are illustrated in FIG. 4.

Generally, the wireless device 110 includes processing circuitry 404, memory 406, wireless network interface 408, user input interfaces 412, and user output interfaces 414. The user input interfaces 412 couple to headset 422, mouse 420, and keyboard 418. The user output interfaces 414 couple to audio/video display device 416. The user output interface 414 may also couple to headphone 422. The display device 416 may include a monitor, projector, speakers, and other components that are used to present the audio and video output to a user. While these components of the wireless device are shown to be physically separate, all of these components could be housed in a single enclosure, such as that of a handheld device. The wireless device 110 embodies the structure and performs operations of the present invention with respect to audio/video stream receipt and processing and operating parameter feedback. Thus, the wireless terminal operates consistently with the operations and structures previously described with reference to FIGS. 1-3 and as will be described further with reference to FIGS. 6-16.

In one particular construct of the wireless device 110, dedicated hardware is employed for audio and/or video encoding and/or decoding operations. In such case, the wireless device 110 includes decoding circuitry 434 and encoding circuitry 436. Alternatively, the wireless device 110 may include non-dedicated video processing, protocol stack, decoding, and/or decoding resources. In such case, these operations of wireless device 110 are serviced by processing circuitry 404. The processing circuitry 404 performs, in addition to its PC operations, protocol stack operations 438 and may perform encoding/decoding operations 440. In such case, particular hardware may be included in the processing circuitry 404 to perform the operations 438 and 440. Alternatively, video processing operations, protocol stack operations 438, and encoding/decoding operations 440 may be accomplished by the execution of software instructions using generalized hardware (or a combination of generalized hardware and dedicated hardware). In this case, the processing circuitry 404 retrieves video processing instructions 424, protocol stack instructions 426, encoding/decoding instructions 428, and/or operating parameter feedback instructions 430 from memory 406. The processing circuitry 404 executes these various instructions 424, 426, 428, and/or 430 to perform the indicated functions. Processing circuitry 404 may include one or more processing devices such as microprocessors, digital signal processors, application specific processors, or other processing type devices. Memory 406 may be any type of digital memory, volatile, or non-volatile, capable of storing digital information such as RAM, ROM, hard disk drive, Flash RAM, Flash ROM, optical drive, or other type of digital memory.

Generally, the wireless device 110 receives a video stream (video/audio stream) that is carried by data packets via the network interface 408 and processes the received video stream. Further, the wireless device 110, in some operations, provides operating parameter feedback to an edge device. In still other operations, the wireless device 110 may output a video stream within data packets via network interface 408 to another device. The network interface 408 supports one or more of WWAN, WLAN, and cellular wireless communications. Thus, the wireless interface 408, in cooperation with the processing circuitry 404 and memory supports the standardized communication protocol operations in most embodiments that have been previously described herein.

Figure 5:
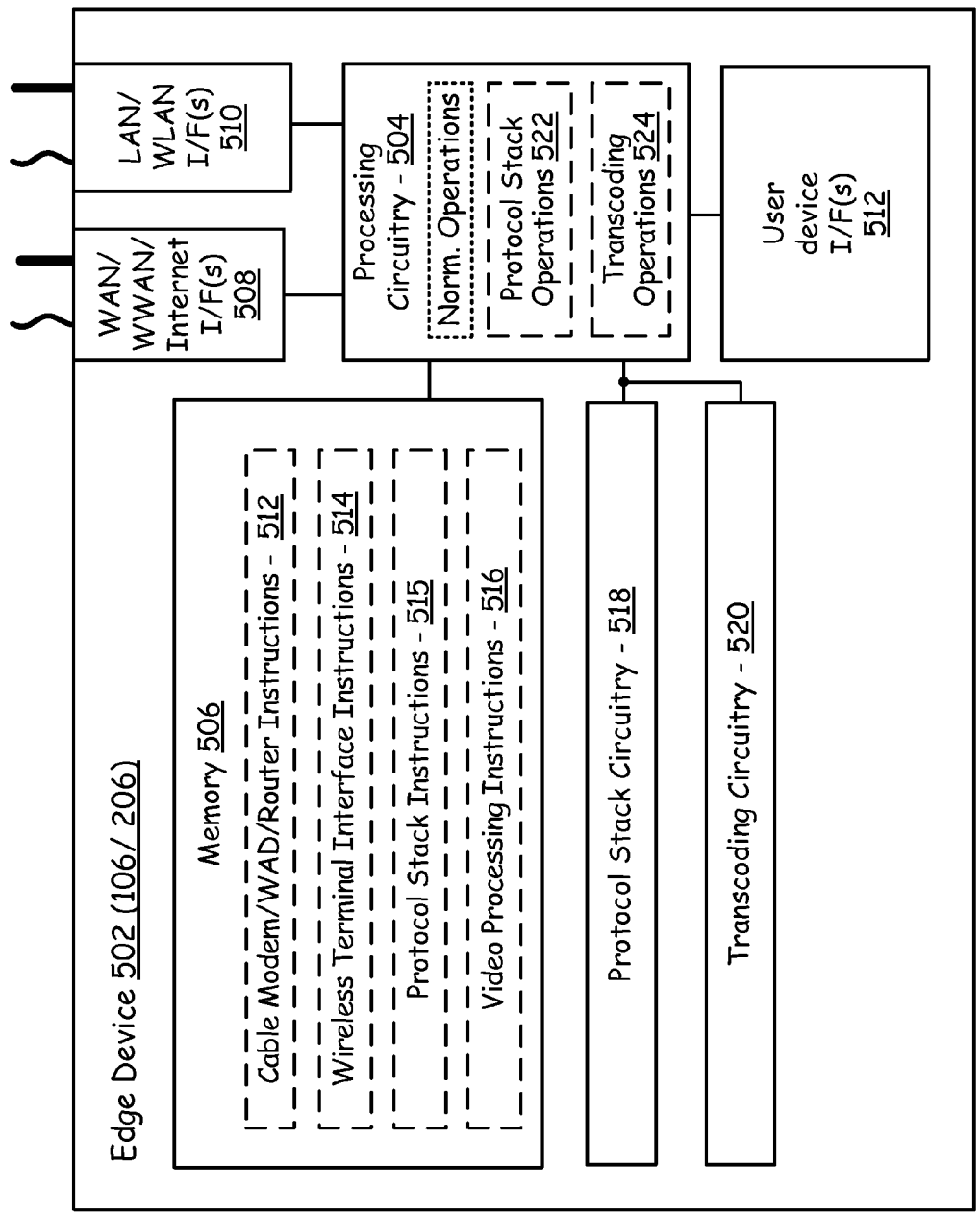
FIG. 5 is a block diagram illustrating a video processing system constructed and operating according to at least one embodiment of the present invention.

FIG. 5 is a block diagram illustrating a video processing system (edge device) constructed and operating according to at least one embodiment of the present invention. The edge device 502 may correspond to the edge device 106 of FIG. 1 and/or the edge device 206 of FIG. 2. The edge device 502 performs the edge device operations previously described with reference to FIGS. 1-3 and that will be further described herein with reference to FIGS. 6-16. To accomplish these operations, the edge device 502 includes processing circuitry 504, memory 506, first and second network interfaces 508 and 510, user device interface 512, and may include specialized circuitry. The specialized circuitry may include protocol stack circuitry 518 and transcoding circuitry 520. The processing circuitry 504 and the memory 506 may be of same/similar structure as was described with reference to the wireless device 110 of FIG. 4. The first network interface 508 supports WAN/WWAN/Internet interface operations while the second network interface 510 supports LAN and WLAN interface operations. Of course, in differing embodiments a single network interface may service all necessary communication interface operations and in still other embodiments, additional network interfaces may be employed.

Protocol stack operations and transcoding operations may be implemented by dedicated hardware such as protocol stack circuitry 518 and transcoding circuitry 520, may be software implemented, or may be a combination of both. In such case, the processing circuitry 504, in addition to its normal operations, performs protocol stack operations 522 and transcoding operations 524. In its operations, the processing circuitry 504 retrieves software instructions from memory and executes these software instructions, which include normal operation instructions 512, wireless terminal interface instructions 514, protocol stack instructions 515, and transcoding instructions 516 from memory 506 and process such instructions.

Figure 6:
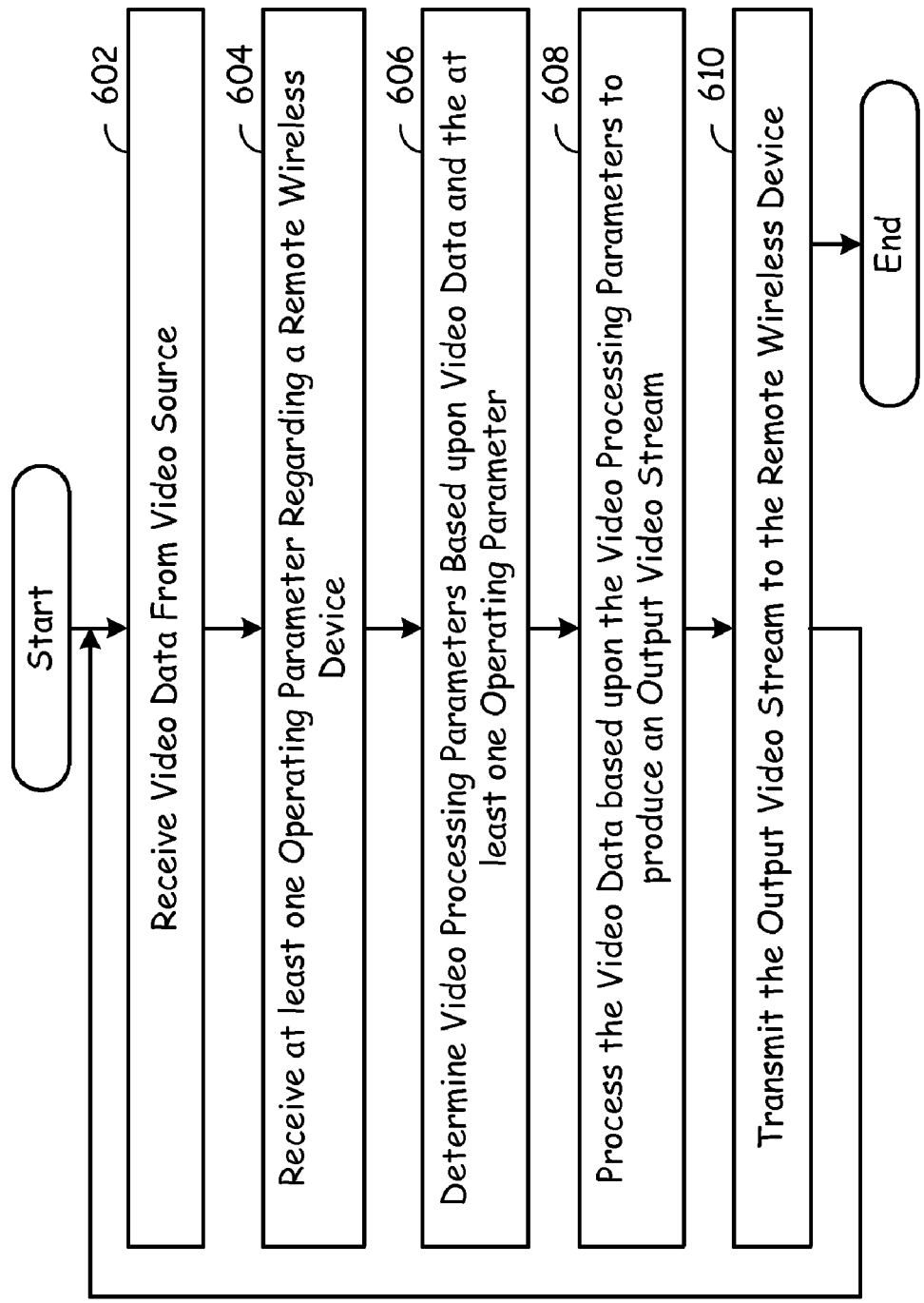
FIG. 6 is a flow chart illustrating operations for video processing according to one or more embodiments of the present invention.

FIG. 6 is a flow chart illustrating operations for video processing according to one or more embodiments of the present invention. The operations 600 of FIG. 6 commence with a video processing system/edge device receiving video data from a video source (Step 602). The video data may be in a format of a block data transfer or a video stream. The structures of FIGS. 1-3 and the particular examples of the edge device/video processing system of FIG. 5 and remote wireless device at FIG. 4 may be employed to perform some/all operations 600 of FIG. 6.

The edge device also receives at least one operating parameter regarding a remote wireless device (Step 604). The at least one operating parameter regarding the remote wireless device may be transmitted to the edge device by the remote wireless device itself. Alternatively, the at least one operating parameter regarding the remote wireless device may be received from a wireless access device (or another wireless network device) that services the remote wireless device or that monitors operations of the wireless network relating to the wireless device. For example, the at least one operating parameter received from the remote wireless device may include a buffer fullness of a decoder of the remote wireless device, a remaining battery life of the remote wireless device, a serviced display resolution of a display of the remote wireless device, a serviced color resolution of a display of the remote wireless device, an indication of decoding error relating to a decoder of the remote wireless device, and/or another parameter relating solely to the operation of the remote wireless device. Each of these operating parameters may be generated by the remote wireless device and passed to the edge device in the operation of Step 604.

The at least one operating parameter regarding the remote wireless device may further be produced by a wireless access device servicing the remote wireless device or by another component of the servicing wireless network. For example, the remote wireless device may provide as the at least one operating parameter an indication of data throughput currently allocated to the remote wireless device by the servicing wireless network. The operating parameters regarding the remote wireless device may change over time, which may influence further operations 600 of FIG. 6.

Operations 600 of FIG. 6 continue with the edge device determining video processing parameters based upon the video data and the at least one operating parameter (Step 606). Operation 600 continues with the edge device processing the video data based upon the video processing parameters to produce an output video stream (Step 608). With one particular example of the operation of Steps 606 and 608, the video data is an incoming video stream that includes a plurality of video frames. Based upon the video processing parameters determined at Step 606, the operations of Step 608 may include processing the video data by altering a frame rate of the incoming video stream received by the edge device to produce the output video stream. In altering the frame rate of the video stream as it is processed at Step 608, the Program Clock References (PCRS) of the video frames may be altered based upon the alteration of the frame rate at Step 608.

Another example of the processing performed at Step 608 includes altering a resolution of video frames of the incoming video stream to produce video frames of the output video stream. By altering the resolution of the video stream at Step 608, the number of pixels in both a horizontal and vertical orientation of the video frames of the video stream may be altered, e.g., by reducing the number of pixels. Such decrease in resolution of the video frames results in an output video stream having poorer quality than the input video stream but requiring fewer wireless resources for transmission by a servicing wireless network and requiring fewer processing resources of the remote wireless device in decoding and displaying the video produced from the video stream to a user.

According to another embodiment of the operation at Step 608, an incoming video stream is processed to produce the output video stream by altering a color resolution of video frames of the incoming video stream. By altering the color resolution of the video frames of the video stream to produce video frames of the output video stream, the amount of information included in each video frame is reduced. Thus, fewer wireless resources and processing resources of the remote wireless device are required in order to transmit and decode the video stream prior to presentation to a user. According to a similar embodiment of the operation of Step 608, the video data is processed to remove color content of video frames of the incoming video stream to produce video frames of the output video stream. In one particular example of this embodiment, color content of video frames of the incoming video stream is removed and the output video stream is simply a black and white video stream. Of course, the output video stream of only black and white content will have a lesser data throughput requirement for transmission to the remote wireless device. Further, the decoding requirements for processing of the black and white output video stream by the remote wireless device are less.

In still another embodiment of the operation at Step 608 of FIG. 6, the edge device identifies an area of interest of video frames of the incoming video stream and alters the video frames based upon knowledge of the area of interest. For example, an area of interest may be a small central portion of a plurality of video frames of the incoming video stream. Based upon the knowledge of the area of interest, the edge device may alter the pixel density within the area of interest, may crop video information outside of the area of interest, and/or may perform a combination of these operations. The video frames after removal of information outside of the area of interest or alteration of information within the area of interest would generally have a reduced data size (Step 610). Area of interest processing will be described further with reference to FIGS. 9 and 10.

The operations of Step 606-610 may change over time based upon the information received at Step 604 of FIG. 6. Thus, during the operations 600 of FIG. 6 in the transport of video data from the video source to the remote wireless device, the edge device may receive operating parameters regarding the remote wireless device on a regular, periodic, or sporadic basis. Based upon the currently received operating parameters regarding the wireless device and also characteristics of the video data as it is received from the video source, the edge device may dynamically determine video processing parameters based upon the video data and the at least one operating parameter regarding the remote wireless device. Thus, in any given time, the edge device may differently process the video data based upon the video processing parameters to produce the output video stream. Since the operation 600 of FIG. 6 is dynamic, the operations 602-610 may be continually altered until the transfer of the video data from the video source to the remote wireless device is completed.

Figure 7:
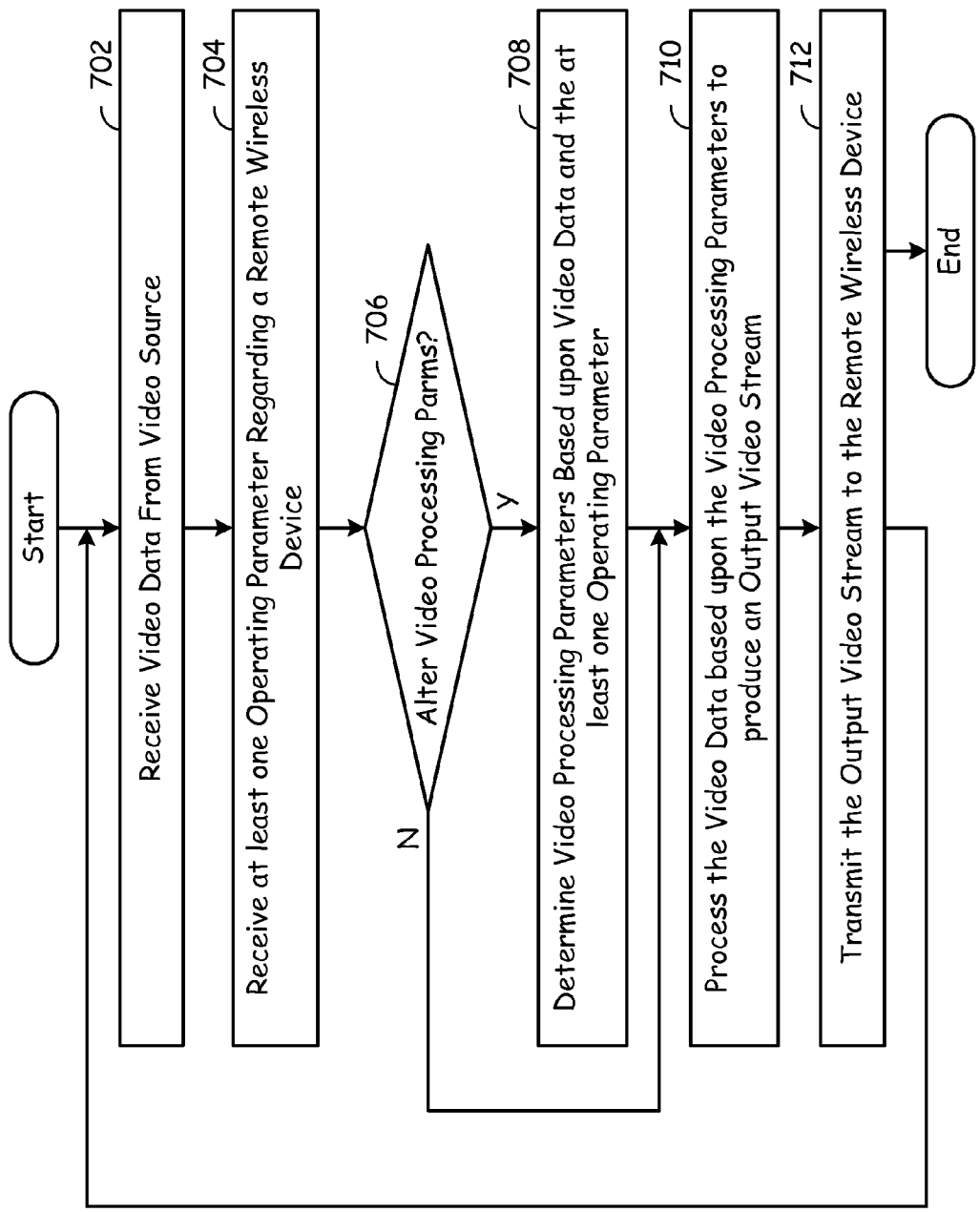
FIG. 7 is a flow chart illustrating operations for video processing according to one or more embodiments of the present invention.

FIG. 7 is a flow chart illustrating operations for video processing according to one or more embodiments of the present invention. Operation 700 commence with the edge device receiving video data from the video source (Step 702). The edge device then receives at least one operating parameter regarding a remote wireless device (Step 704). This at least one operating parameter may be received directly from the remote wireless device (via a wireless link and one or more intervening communication networks). Alternatively, some or all the at least one operating parameters may be received from a wireless access device servicing the remote wireless device (or another component of a servicing wireless network). Based upon the content of the video data as received at Step 702 and the at least one operating parameter received at Step 704, the edge device may determine whether to alter its video processing parameters (Step 706). As will be further described herein with reference to FIGS. 11-13, the transfer of the video data from the video source to the remote wireless device is based in part upon the available throughput of a servicing wireless network and/or intermediate wireless networks. Thus, at any given time, the availability of throughput from the edge device to the remote wireless device will affect the manner in which the video data must be processed.

Initially, at start-up, as was described previously with reference to FIG. 6, video processing parameters were determined. Then, during transport of the video data from the video source to the remote wireless device, the edge device may update or alter its video processing parameters. When no alteration is required, operation proceeds from Step 706 to 710. However, when alteration of the video processing parameters is required as determined at Step 706, the edge device determines new video processing parameters based upon the video data and the at least one operating parameter (Step 708). Then, operation includes processing the video data based upon the video processing parameters to produce an output video stream (Step 710) that is transported by the edge device to the remote wireless device via at least the servicing wireless network (Step 712). The operation 700 of FIG. 7 continues until the transport of the video data from the video source to the remote wireless device is no longer required.

Figure 8:
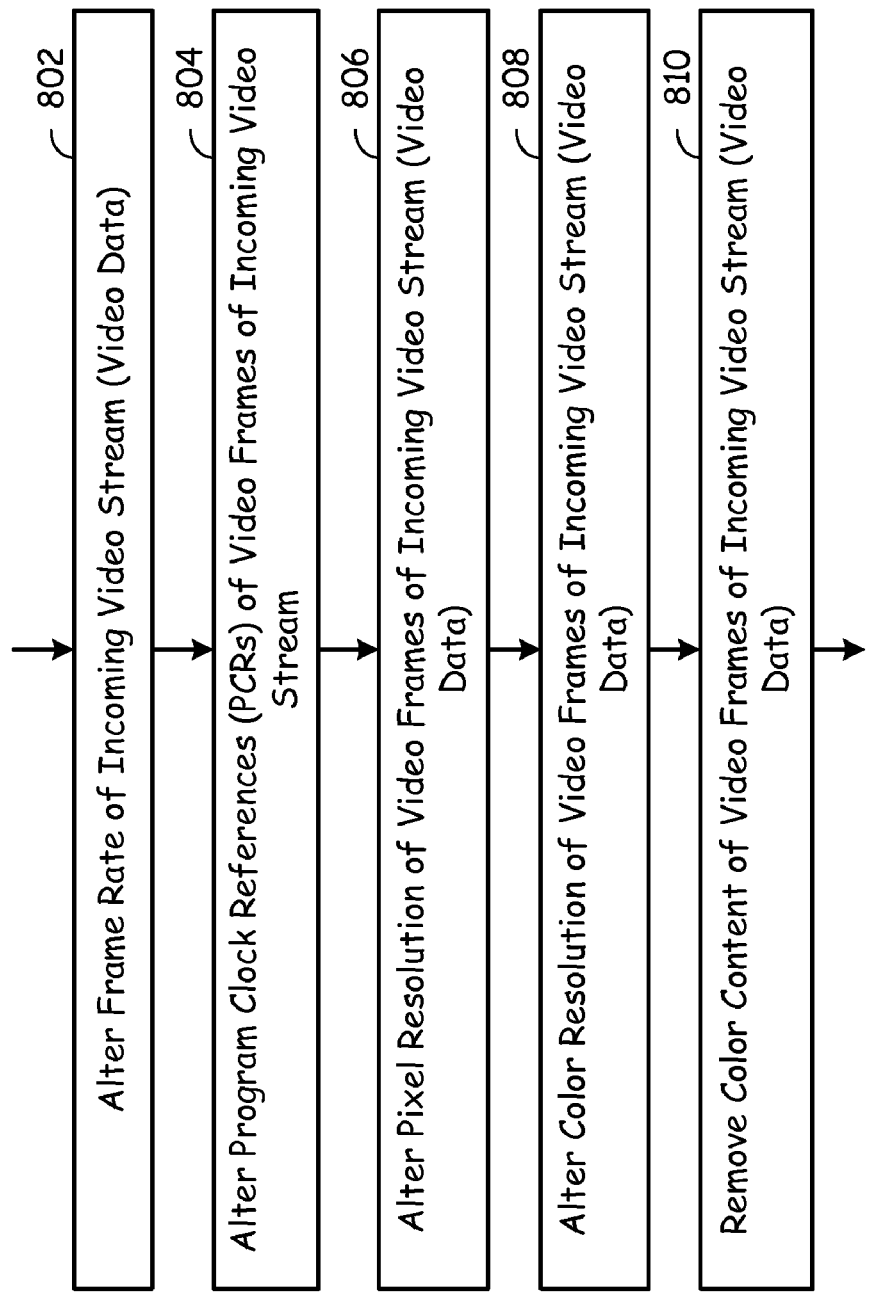
FIG. 8 is a flow chart illustrating operations for altering a video stream according to one or more embodiments of the present invention.

FIG. 8 is a flow chart illustrating operations for altering a video stream according to one or more embodiments of the present invention. Referring now to FIG. 8, the operations of Steps 608 and 710 are further described. The operations 608/710 of FIG. 8 include a number of particular processing operations. These processing operations may be individually, partially, or fully employed in processing of the incoming video data to produce the outgoing video stream that is subsequently transferred to the remote wireless device. Some or all these operations 608/710 may be performed at any given time. Further, in some operations, none of these video processing operations of FIG. 8 are required because the edge device simply passes an incoming video stream as an outgoing video stream for delivery to the remote wireless device.

The operations of FIG. 8 may include altering a frame rate of an incoming video stream (video data) to produce an outgoing video stream (Step 802). Generally, when the frame rate of the incoming video stream is altered to produce the outgoing video stream, PCRs may/should be required to be altered based upon the alteration of frame rate of the incoming video stream (Step 802). Operation 608/710 of FIG. 8 may also/alternately include altering a pixel resolution of video frames of the incoming video stream (video data) to produce the output video stream (Step 806). In altering the pixel resolution of the video frames of the incoming video stream, the edge device may simply reduce the number of pixels of video frames of the video stream by combining pixel data. For example, if an incoming video stream has a pixel resolution of 800×600, the operation of Step 806 may include altering the pixel resolutions from 800×600 to 400×300, for example. Of course, altering pixel resolution of the video frames may include moving from one standard pixel resolution to another standard pixel resolution, the second pixel resolution having lesser resolution than the first.

The operation 608/710 of FIG. 8 may further include altering a color resolution of video frames of the incoming video stream to produce the output video streams (Step 808). The operations of FIG. 8 may also include removing color content of video frames of the incoming video stream to produce the output video stream (Step 810). By reducing the color resolution of the video frames or removing color from the video frames to produce black and white video frames, the data size of the output video stream as compared to the incoming video stream is reduced.

Processing of the video stream may be required in order to cause the output video stream to comply with a data throughput support provided by the servicing wireless network. Alternatively, alteration of the incoming video data/video stream to produce the output video stream may be performed in order to compensate for then current operating characteristics of the remote wireless device. For example, if the remote wireless device has limited processing resources available or limited battery life available, the decoding processing operations performed by the remote wireless device should be reduced. In reducing these decoder processing requirements, the edge device alters the video data/incoming video stream to produce the output video stream in a fashion that reduces the decoder processing requirements of the remote wireless device. Reduced decoder processing requirements of the remote wireless device not only frees up the resources of the remote wireless device for other purposes but reduces battery consumption of the remote wireless device.

Figure 9:
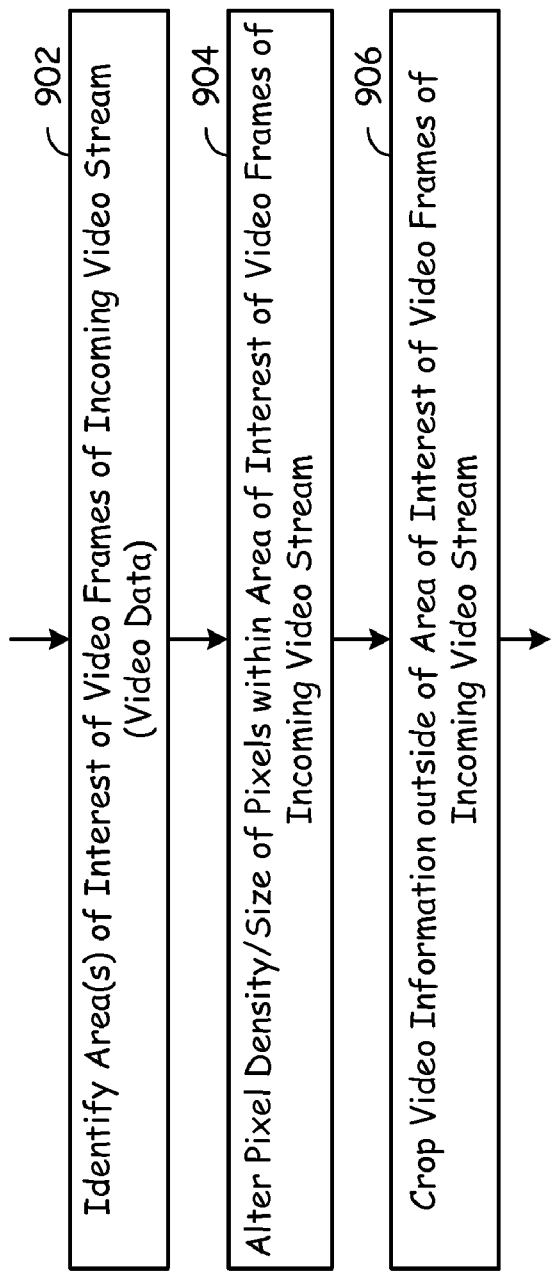
FIG. 9 is a flow chart illustrating operations for area of interest processing according to one or more embodiments of the present invention.

FIG. 9 is a flow chart illustrating operations for area of interest processing according to one or more embodiments of the present invention. The operations of Steps 608/710 of FIGS. 6 & 7 may include area of interest processing. In performing area of interest processing, the edge device determines particular areas of interest of video frames of the incoming video stream (Step 902). In identifying the areas of interest of the video frames, the edge device may receive auxiliary information from the video source or may extract information from the video stream itself. With the knowledge of one or more areas of interest of particular video frames, the edge device may alter the pixel density within the area of interest or outside of the area of interest of the video frames (Step 904). With the operation of Step 904, the edge device may maintain resolution within an area of interest of the video frames while decreasing the resolution outside of the area of interest of the video frames. Alternatively or in combination with the operations of Step 904, the edge device may crop information of the video frames outside of the area of interest (Step 906). By removing video information from the video frames of the incoming video stream, processing performed at Step 906 will decrease the overall size of the video frames from a data standpoint. Reduction in the data size of the video frames reduces the data transferring requirement from the edge device to the remote wireless device.

FIG. 10 is a diagram illustrating area of interest processing of video frames of a video stream according to one or more embodiments of the present invention. As shown in FIG. 10, the incoming video stream may be viewed as a plurality of video frames. For example, a plurality of video frames 1004 of an incoming video stream includes a first video frame 1006a. Video frame 1006a may include two separate areas of interest 1012 and 1014. The information identifying these areas of interest may be included with the video frames themselves or be received by the edge device as separate information from video source that supplies the incoming video stream. Likewise, a sequence of video frames 1010 of a video stream may include an area of interest 1016.

According to a first operation of an edge device according to the present invention, the edge device may identify area of interest 1012 and crop the video frame 1006 to produce video frame 1018a. Likewise, the edge device may crop the plurality of video frames 1004 to produce a sequence of video frames 1020 that includes only information contained within area of interest 1012. Likewise, in a differing operating, edge device would identify area of interest 1014 and crop video frame 1006a to produce video frame 1018b. Likewise, this area of interest 1014 may be employed to produce a series of video frames 1030 corresponding to area of interest 1014. In producing the output video stream for delivery to the remote wireless device, the edge device may produce the sequence of video frames 1020 and/or the sequence of video frames 1030 to the remote wireless device. Because each of the video streams 1020 and 1030 includes less information than the sequence of video frames 1004 of the corresponding video stream, the data throughput required to transfer video sequence 1020 and/or 1030 as video stream(s) is less than that to transfer the sequence 1004 as a video stream.

Still referring to FIG. 10, area of interest of processing by an edge device may include identifying area of interest 1016 within video frame 1006b of a sequence of video frames 1010 of the incoming video stream. In processing the sequence of video frames 1010 of the incoming video stream, the edge device may crop the video frames 1006b based upon the area of interest identification 1016 to produce video frame 1018c. Likewise, the edge device would process each of the video frames 1010 of the incoming video stream to produce the sequence 1040 of video frames corresponding to area of interest 1016. In performing this area of interest processing, the edge device may also effectively alter the pixel density of the output video stream by cropping the video frames of the video stream 1010. Alternatively, the edge device may simply alter the resolution of each video frame of the video frame sequence.

Figure 11:
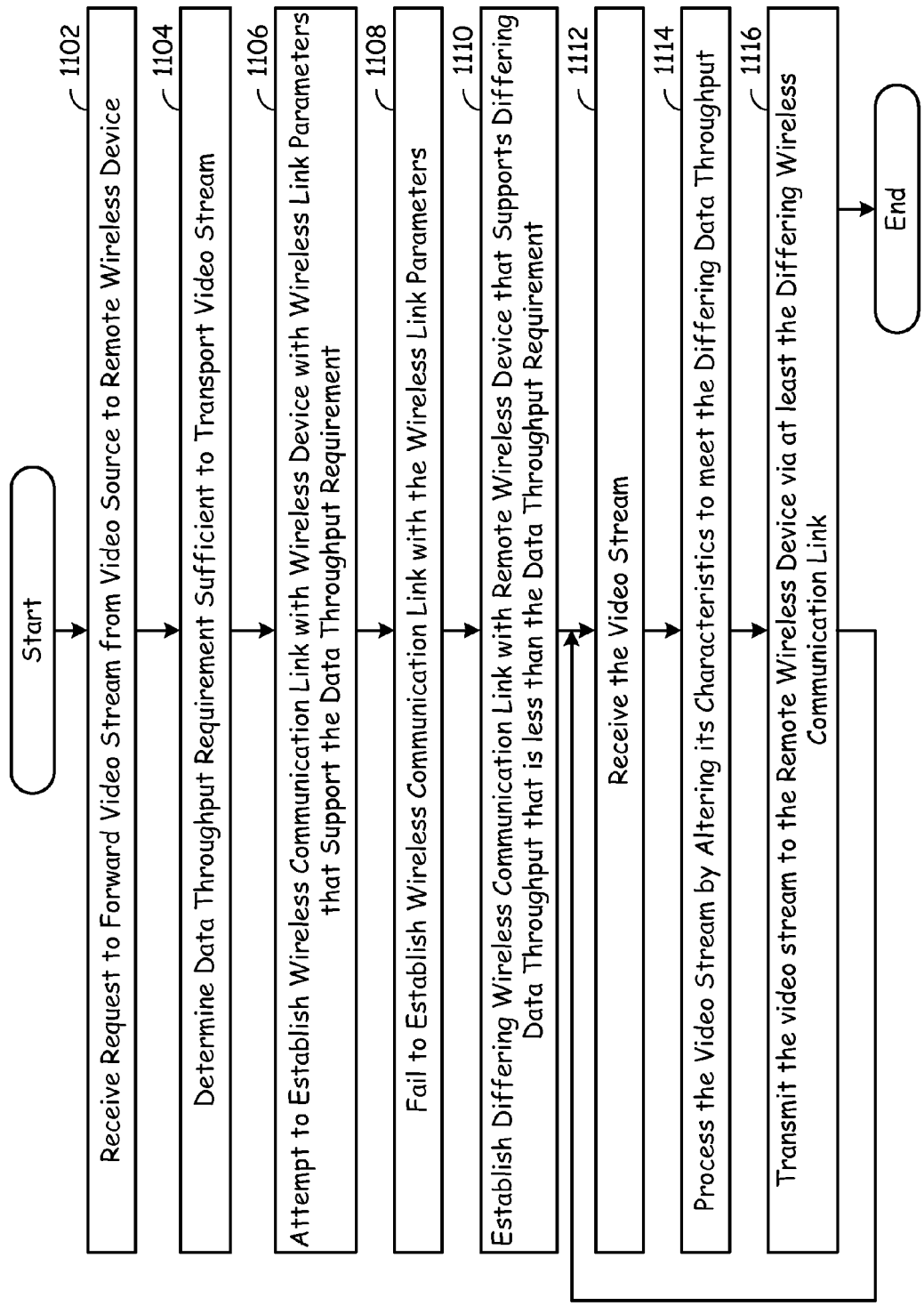
FIG. 11 is a flow chart illustrating operations for establishing wireless link(s) according to one or more embodiments of the present invention.

FIG. 11 is a flow chart illustrating operations for establishing wireless link(s) according to one or more embodiments of the present invention. The operations 1100 of FIG. 11 are performed by an edge device or video processing system previously described herein with reference to FIGS. 1-3 and 5. Operation 1100 commences with the edge device receiving a request to forward a video stream from a video source to a remote wireless device (Step 1102). This request may be received from the video source, from the remote wireless device, or from an intermediate device such as a wireless access device. The video stream may be stored by a video source coupled directly to the edge device such as shown as video source 102 of FIG. 1 or video source 208 of FIG. 2. Alternatively, the video stream may be received from a video source not coupled directly to the edge device such as video source 100 of FIG. 1 or video source 100 of FIG. 2. In either case, the edge device 106 of FIG. 1 or 206 of FIG. 2, for example, determines a data throughput requirement sufficient to transport the video stream to the remote wireless device via at least one servicing wireless network (Step 1104). The data throughput requirement sufficient to transport the video stream to the remote wireless device via the at least one servicing wireless network is based upon characteristics of the video stream. Further, this data throughput requirement may be based upon other considerations such as known processing limitations or battery life limitations of the remote wireless device.

The edge device then attempts to establish a wireless communication link with the remote wireless device via at least one servicing wireless network with wireless link parameters that support the data throughput requirement (Step 1106). The manner in which the edge device attempts to establish a communication link with the remote wireless device via the servicing wireless network is based upon at least the manner in which the edge device communicates with components of the servicing wireless network. For example, referring to FIG. 1, edge device 106 couples directly with wireless access device 108 and may in fact be combined with wireless access device in a single location. In such case, direct communication between edge device 106 and a wireless access device 108 is employed to attempt to establish the wireless communication link. Alternatively, referring to FIG. 1, edge device 206 couples to wireless access device via network(s) 104. In such case, a messaging session is setup between edge device 206 and wireless access device 108 that is used by edge device 206 in an attempt to establish the wireless communication link.

Operation continues with the edge device failing to establish the wireless communication link with the wireless link parameters with the servicing wireless network (Step 1108). This failure at Step 1108 may be caused by a lack of wireless resources available within the servicing wireless network. Alternatively, this failure to establish the wireless communication link by the servicing wireless network may be caused by other limitations of the remote wireless device itself such as failure to support necessary protocols, lack of sufficient subscriber level of service, or other limitations. Based upon the failure at Step 1108, the edge device establishes a differing wireless communication link with remote wireless device that supports a differing data throughput that is less than the data throughput requirement of Step 1104 (Step 1110). In establishing this differing wireless communication link at Step 1110, the edge device may select the differing data throughput requirement. Alternatively, the edge device may simply request allocation of a wireless link by the servicing wireless network with an available data throughput. In another case, the edge device establishes the differing wireless communication link at Step 1110 that is employed to transport the video stream to the remote wireless device.

The edge device then receives the video stream from the video source (Step 1112). The edge device then processes the video stream by altering the characteristics of the video stream to meet the differing data throughput that was allocated via operations of Step 1110 (Step 1114). The edge device then transmits the video stream to the remote wireless device via at least the differing wireless communication link that was allocated at Step 1110 (Step 1116). The edge device continues to transmit the video stream to the remote wireless device via at least the differing wireless communication link at Step 1116 as processed at Step 1114 until transmission is complete. Based upon the characteristics of the input video stream received at Step 1112, the processing performed at Step 1114 may change over time. Further, the characteristics of the wireless communication link may change over time based upon availability of resources within the servicing wireless network. In such case, based upon changes in availability of resources in the servicing wireless network, the wireless link parameters may change over time resulting in differing data throughput supported by the wireless link between a wireless access device and a remote wireless device. In such case, based upon these changes in the throughput supported by the servicing wireless network, the processing performed at Step 1114 may also change based upon these communication link changes.

The wireless link parameters described herein with reference to the operations of FIG. 11 may include various differing wireless parameters in the wireless network. These selectable or configurable wireless parameters will differ from wireless network to wireless network. Generally, however, the wireless link parameters include slot assignment parameters, channel assigned parameters, transmit power allocation parameters, beamforming parameters, multi-input-multi-output (MIMO) parameters, modulation parameters, and coding parameters. These wireless link parameters may be directly or indirectly modified by operations of the edge device via interaction with the servicing wireless network. In some embodiments, however, these wireless link parameters are indirectly modified based upon control of the edge device. In such case, the edge device may simply request wireless link of particular data throughput by the servicing wireless network. In such case, one or more devices of the servicing wireless network would choose these wireless link parameters in response to the request from the edge device.

In the operations of Step 1104, the edge device determines the data throughput requirements sufficient to transport the video stream. Characteristics of the video stream that the edge device uses to determine such data throughput requirement include, for example, a frame rate of the video stream to be transported, a pixel resolution of video frames of the video stream to be transported, and/or a color resolution of video frames of the video stream. These characteristics either singularly or in combination may be employed to characterize the data throughput requirement that is sufficient to transport the video stream from the edge device to the remote wireless device. As the reader shall recall, data transfer availability from the video source to the edge device is fairly robust while the wireless link servicing transport of the video stream from the edge device to the remote wireless device is variable and of typically lesser data carrying capable. In such case, the edge device is required to not only manage transport of the video stream from the video source to the remote wireless device but to process the video stream to ensure that the allocated wireless communication link can adequately service transport of the video stream.

According to one particular embodiment of the present invention, the edge device interfaces with the servicing wireless device in an indirect fashion when allocating or establishing wireless link parameters. In this case, the edge device determines a quality of service (QoS) required to meet the data throughput requirement. With this determination of QoS made, the edge device interfaces with the servicing wireless network to allocate the wireless communication link with wireless link parameters that meet the QoS requirement. In such case, the edge device indirectly causes allocation of a wireless link with the wireless link parameters to support transport of the video stream based upon the QoS determination. Such QoS characterization and determination may be employed both to characterize the data throughput requirements and the differing data throughput that is serviced at Step 1110.

Figure 12:
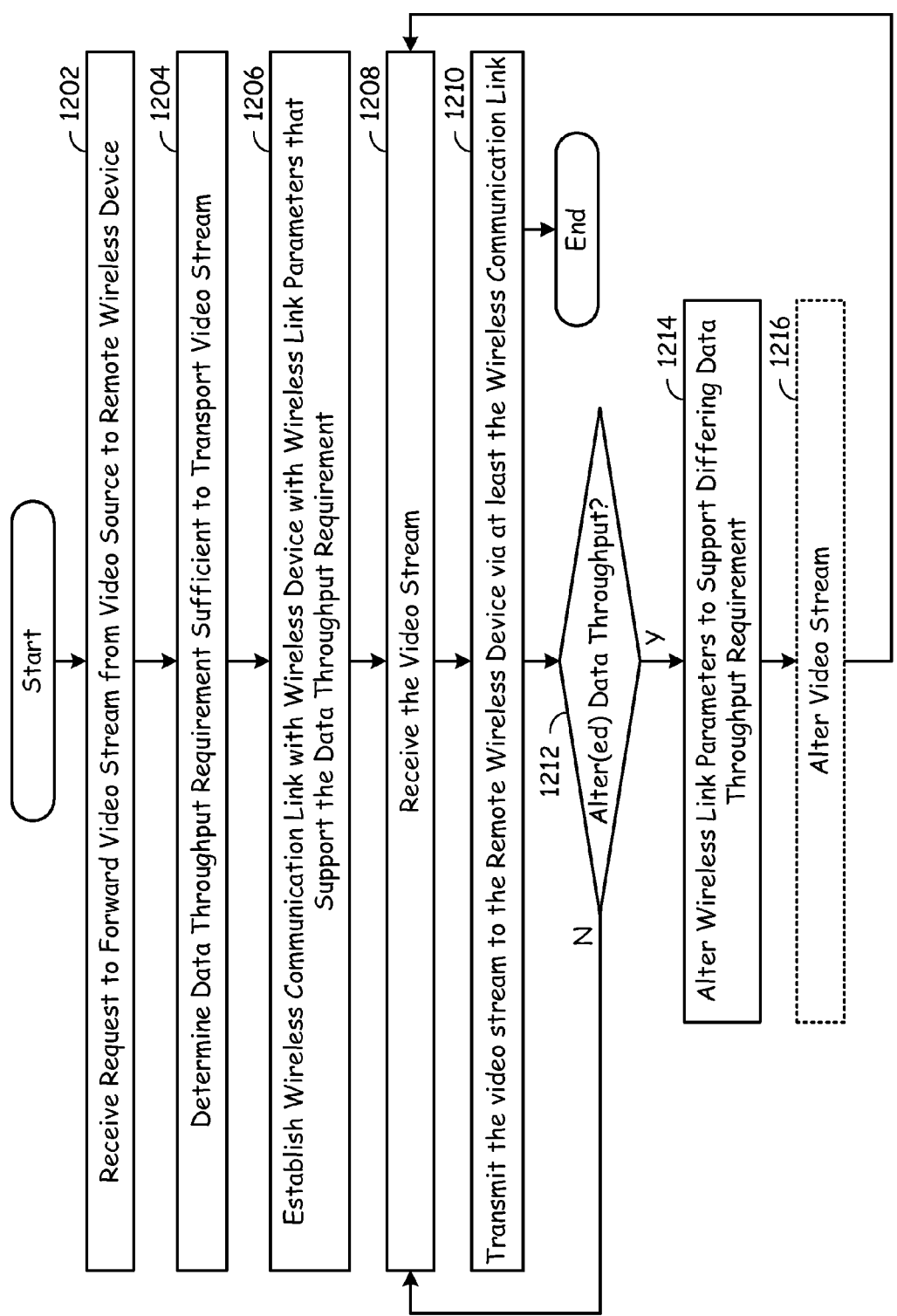
FIG. 12 is a flow chart illustrating operations for establishing wireless link(s) according to one or more embodiments of the present invention.

FIG. 12 is a flow chart illustrating operations for establishing wireless link(s) according to one or more embodiments of the present invention. The operations 1200 of FIG. 12 are similar to those of the operations 1100 of FIG. 11. However, with the operations 1200 of FIG. 12, a wireless link is initially established with sufficient data throughput to support the incoming video stream. Then the wireless link is subsequently altered based upon differing requirements of transport of the video stream. Operation 1200 commences with the edge device receiving a request to forward a video stream from a video source to a remote wireless device (Step 1210). Then, the edge device determines a data throughput requirement sufficient to transport the video stream to the remote wireless device (Step 1204). This determination is made based upon at least one of the frame rate of the video stream, video frame size, content of video frames of the video stream, and other characterizations.

The edge device then establishes a wireless communication link with the remote wireless device via a servicing wireless network with wireless link parameters sufficient to support the data throughput requirement (Step 1206). In making this allocation of the wireless communication link with the wireless link parameters, the edge device may directly interface with one or more components of the servicing wireless network to establish the wireless link. Alternatively, the edge device may simply determine a QoS required to meet the data throughput requirement and to allocate the wireless link with wireless link parameters that meet the QoS required.

The edge device then receives the video stream (or video data) from the video source (Step 1208). The edge device then transmits the video streams to the remote wireless device via at least the wireless communication link (Step 1210). With the embodiment of FIG. 1, the edge device 106 couples directly to wireless access device 108 and simply transfers the video stream via wireless access device 108 to wireless device 110 with the wireless link parameters. Alternatively, with the embodiment of FIG. 2, the edge device 206 transfers the video stream 212 via network(s) 104 and wireless access device 108 across wireless link to wireless device 110.

Referring again to FIG. 12, during transmission of the video stream to the remote wireless device via at least the wireless communication link at Step 1210, the edge device may detect or determine that an altered data throughput condition exists (Step 1210). This altered data throughput condition may be based upon limitations of the servicing wireless network and its ability to service the previously established wireless communication link. For example, the servicing wireless network may not longer be able to support the wireless link at the data throughput requirement. Alternatively, the edge device may determine that the video stream has changed in character so that a differing data throughput is required. In either case, upon a positive determination of Step 1210, the edge device alters the wireless link parameters to support a differing data throughput requirement (Step 1214). The operations at Step 1214 are accomplished by the edge device via interaction with at least one component of the servicing wireless network. Because the differing data throughput requirement or availability may be less than the previously established data throughput requirement at Step 1206, the edge device may be required to alter the video stream at optional Step 1216. Operation continues via Steps 1208 through Step 1216 until data transfer is no longer required.

Figure 13:
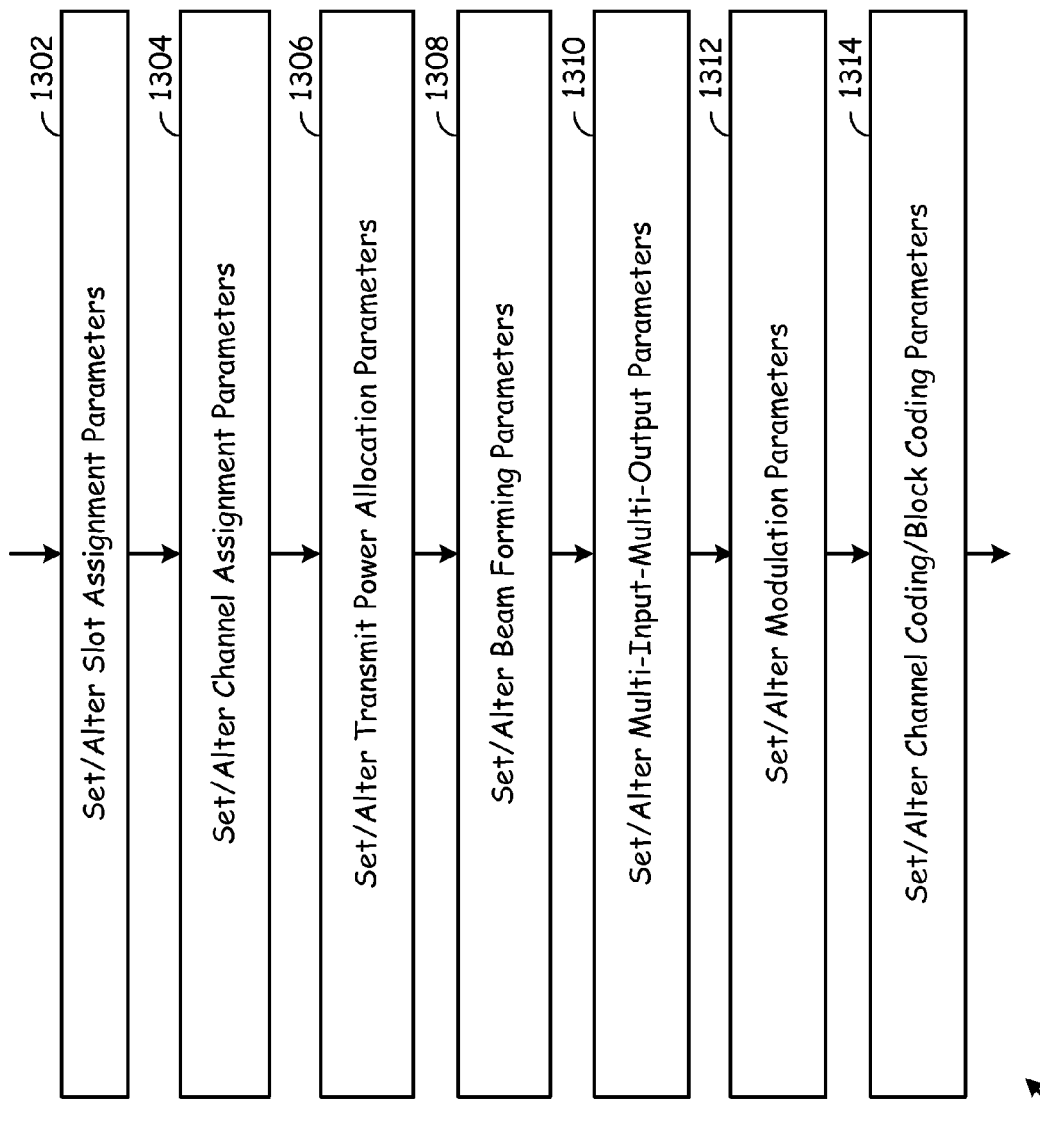
FIG. 13 is a flow chart illustrating operations for establishing/altering wireless link(s) according to one or more embodiments of the present invention.

FIG. 13 is a flow chart illustrating operations for establishing/altering wireless link(s) according to one or more embodiments of the present invention. Referring now to FIG. 13, the various operations of Step 1106 and 1110 of FIG. 11 and Steps 1206 and 1214 of FIG. 12 are described. Some or all of the operations of FIG. 13 are employed when altering or establishing wireless link parameters. The reader should understand that these wireless link parameters may be singularly or multiply set and altered according to various operations of embodiments of the present invention. According to some of these operations, the wireless link parameters may be established or changed by setting or altering slot assignment parameters of the wireless link servicing the remote wireless device (Step 1302). Wireless link parameters may also be established or changed by setting or altering channel assignment parameters (Step 1304), by setting or altering transmit power allocation parameters (Step 1306), by setting or altering beam forming parameters (Step 1308) and/or by setting or altering Multiple-Input-Multiple-Output (MIMO) parameters (Step 1310). The wireless link parameters may also be established or modified by setting or altering modulation parameters (Step 1312) and/or by setting or altering channel coding/block coding parameters (Step 1314).

Figure 14:
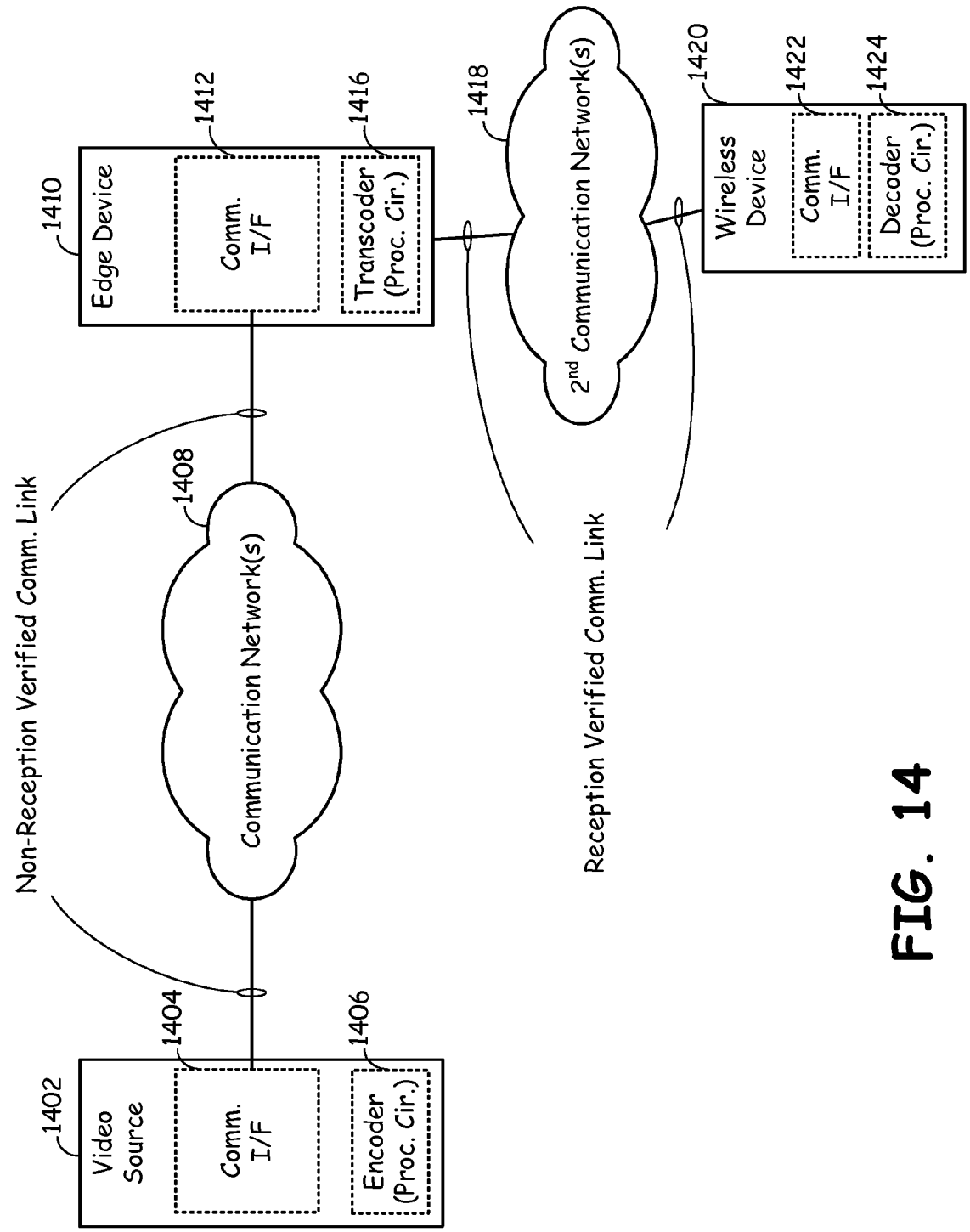
FIG. 14 is a partial system diagram illustrating operations for reception verified/non-reception verified video data/ stream transfer according to one or more embodiments of the present invention.

FIG. 14 is a partial system diagram illustrating operations for reception verified/non-reception verified video data/stream transfer according to one or more embodiments of the present invention. According to this aspect of the present invention, the edge device establishes different types of communication links between itself and the video source and itself and the remote wireless device. In such case, the edge device 1410 establishes a non-reception verified communication link with video source 1402 via communication network(s) 1408. Communication networks 1408 may include one or more of the types of networks previously described with reference to network(s) 104 of FIGS. 1 and 2. The non-reception verified communication link may include the User Datagram Protocol (UDP) communication protocol or another non-reception verified communication link. The reception verified communication link may be serviced by at least one of the Transmission Control Protocol (TCP), the Streamed Transmission Control Protocol (STCP), and/or the Streamed Video File Transfer Protocol (SVFTP). Video source 1402 includes communication interface 1404 and encoder (processing circuitry) 1406. Communication interface 1404 interfaces with communication interface 1412 of edge device 1410 in establishing and servicing the non-reception verified communication link.

The edge device 1410 establishes a reception verified communication link with wireless device 1420 via communication interface 1412 and a communication interface 1422 of the remote wireless device 1420 via $2^{nd}$ communication network(s) 1418. The remote wireless device 1420 includes a decoder (processing circuitry) 1424. Generally, $2^{nd}$ communication networks 1418 include a servicing wireless network and may include one or more intervening wired or wireless networks.

For example, referring to FIG. 1, edge device 106 may establish a reception verified communication link with remote wireless device 110 via wireless access device 108. Further, the edge device would establish a non-reception verified communication link with video source 100 or video source 102 via the coupling infrastructure illustrated in FIG. 1. Referring to FIG. 2, the edge device 206 would establish a reception verified communication link with wireless device 110 via network(s) 104 and the wireless access device 108. Further, edge device would establish a non-reception verified communication link with video source 208 or video source 100 via network(s) 104.

Referring again to FIG. 14, the edge device 1410 receives a video stream (or video data) from the video source 1410 via its communication interface 1412 using the non-reception verified communication link. The edge device 1410 then transmits a video stream to the remote wireless device via its communication interface 1412 using the reception verified communication link. The reception verified communication link traverses the $2^{nd}$ communication network(s) 1418 and is serviced by the communication interface 1422 of wireless device 1420.

In performing these operations, the edge device 1410 may be required to compensate for differing data throughputs supported by the non-reception verified communication link and the reception verified communication link. In such case, the edge device (video processing system) processes the video stream based upon characteristics of the reception verified communication link. In such case, processing of the video stream may include altering a frame rate of video stream, altering pixel resolution of video frames of the video stream, altering color resolution of video frames of the video stream, and/or performing area of interest processing of video frames of the video stream. These of operations were described previously with reference to FIGS. 6-10. These particular operations can be performed in accordance with the operations of FIGS. 14-16 described subsequently herein.

Figure 15:
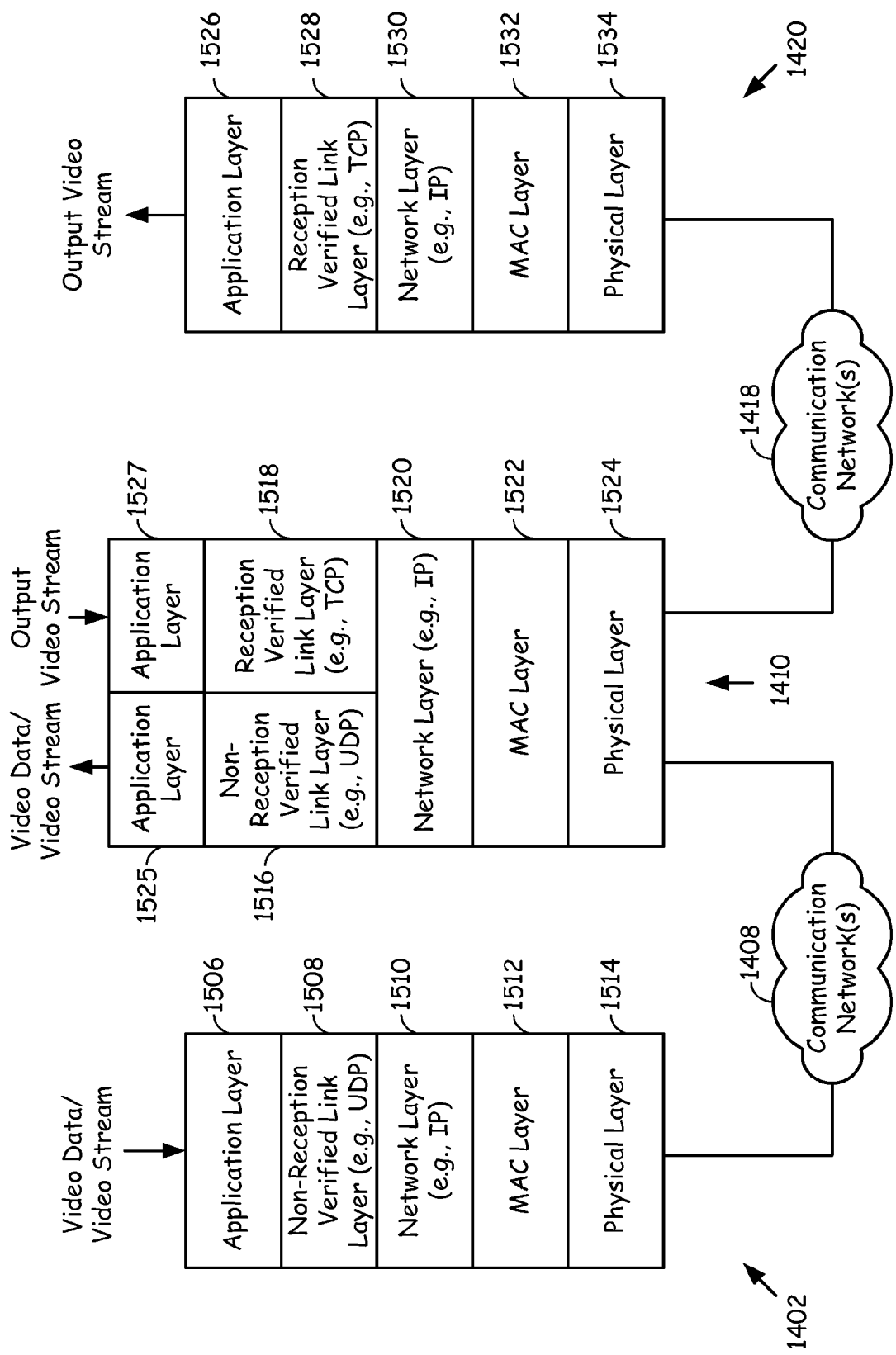
FIG. 15 is a block diagram illustrating protocol layer operations according to one or more embodiments of the present invention.

FIG. 15 is a block diagram illustrating protocol layer operations according to one or more embodiments of the present invention. The illustrated protocol stacks are supported by video source 1402, edge device 1410, and remote wireless device 1420. Communication network(s) 1408 couple video source 1402 to edge device 1410 while communication network(s) 1418 couple edge device 1410 to remote wireless device 1420. The video source 1402 either receives or locally stores video data in a block format. The video source 1402 may transport the video data to the edge device 1410 in a block or stream format. To support the transfer of the video data/video stream to the edge device 1410, the video source 1402 services an application layer 1506, a non-reception verified link layer 1508, a network layer 1510, a Media Access Control (MAC) layer 1512, and a physical layer 1514. The components of this protocol layer stack may comply with the TCP/IP protocol stack or other standardized protocol stack. In the particular example of FIG. 15, the non-reception verified link layer 1508 may include a UDP layer. Further, the network layer 1510 may include the Internet protocol layer. The MAC layer 1512 and physical layer 1514 are dependent upon the manner in which the video source 1402 interfaces with the communication networks 1408. The MAC layer 1512 and physical layer 1514 may service a wired interface or a wireless interface, depending upon the particular implementation.

In servicing the non-reception verified communication link with the video source 1402, the edge device 1410 includes a non-reception verified link layer 1516, network layer 1520, MAC layer 1522, and physical layer 1524. The edge device 1410 receives the video data/video stream from the video source 1420 via the physical layer 1524, MAC layer 1522, network layer 1520 and non-reception verified link layer 1516. The edge device 1410 may also include application layer 1525 that it employs for interface of receipt of the video data/video stream and outputs. The edge device 1410 receives the video data/video stream via the application layer 1525 and may process the video data/video stream based upon its processing requirements. Application layer 1527 receives the output video stream and passes the output video stream via reception verified link layer 1518, network layer 1520, MAC layer 1522, and physical layer 1524 to communication network 1418. When the edge device 1410 does not process the video stream, bridging at the transport layer (or another layer) may occur. Communication network(s) 1418 carries the output video stream to the destination wireless device 1420. Communication network(s) 1418 include at least one servicing wireless network. The network layer 1520, MAC layer 1522, and physical layer 1524 of the edge device 1410 service the receipt of the incoming video data/video stream and transmission of the output video stream, although servicing may be via differing reception and transmission paths. The reception verified link layer 1518 of the edge device may be a TCP layer, an STCP layer, or a SVSTP layer. Remote wireless device 1420 includes a corresponding reception verified link layer 1528. Further, the remote wireless device includes an application layer 1526, a network layer 1530, a MAC layer 1532, and a physical layer 1534. These communication protocol layers support receipt of the output video stream as transmitted by the edge device 1420. These communication protocol layers also support communication with the edge device 1420 for transmission of its operating parameters, for example. The protocol stack illustrated of the remote wireless device supports the other requirements in receipt of the output video stream, for example, automatic retransmission requests, data flow, queuing of data, and other operations.

FIG. 16 is a flow chart illustrating operations for reception verified/non-reception verified video data/stream transfer according to one or more embodiments of the present invention. The operation 600 of FIG. 16 is consistent with the structures described with reference to FIGS. 14 and 15. The operation 600 of FIG. 16 commences with the edge device establishing a reception verified communication link with a remote wireless device (Step 1602). Operation continues with the edge device establishing a non-reception verified communication link with a video source (Step 1604). The operations of Step 1602 and 1604 have previously been described herein with reference to FIGS. 14 and 15. Operation continues with the video source coding the video data into a video stream (Step 1606). As was previously described, the video source may transfer video data to the edge device in a block format or a video stream format. When the video data is transferred from the video source to the edge device in a video stream format, the operation of Step 1606 is required.

Operation continues with the video source transmitting the video data/video stream to the edge device via the non-reception verified communication link (Step 1608). Operation then continues with the edge device receiving the video data/video stream (Step 1610). The edge device then encodes the video data into a video stream when required, transcodes the video stream when required, and/or alters the video data or alters the video stream if required based upon characteristics of the reception verified communication link with the remote wireless device (Step 1612). The operations of Step 1612 may be performed consistently with the operations previously described with reference to FIGS. 6-11 so that the transmitted video stream is supported by the reception verified communication link. Operation is completed with the edge device transmitting the video stream to the remote wireless device via the reception verified communication link (Step 1614). The operations of FIG. 16 may be altered according to embodiments previously illustrated and described with reference to FIGS. 6-13 in processing the video stream. Further, the operation 1600 of FIG. 16 may be further altered in accordance with those operations previously described for altering characteristics of the reception verified communication link between the edge device and the remote wireless device.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip", as used herein, refers to an integrated circuit. Circuits and circuitry may comprise general or specific purpose hardware, or may comprise such hardware and associated software such as firmware or object code.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A video processing system comprising:
   a communications interface that receives video data from a video source, that receives at least one operating parameter regarding a remote wireless device, and that transmits an output video stream to the remote wireless device;
   video processing circuitry coupled to the communications interface that receives the video data and the at least one operating parameter, that determines video processing parameters based upon the video data and the at least one operating parameter, that processes the video data based upon the video processing parameters to produce the output video stream, and that provides the output video stream to the communications interface for transmission to the remote wireless device;
   wherein the video data is an incoming video stream and the video processing circuitry processes the video data based upon the video processing parameters to produce the output video stream by:
      determining a plurality of areas of interest in each video frame of a plurality of video frames in the incoming video stream;

cropping each video frame of the plurality of video frames to produce a first plurality of cropped video frames having one of the plurality of areas of interest;

cropping each video frame of the plurality of video frames to produce a second plurality of cropped video frames having another one of the plurality of areas of interest; and providing the first plurality of cropped video frames and the second plurality of cropped video frames to produce the output video stream; and processing circuitry coupled to the communication interface, the processing circuitry operable to:

determine a data throughput requirement to transport the output video stream over a communication link to the remote wireless device;

determine communication link characteristics in response to the data throughput requirement and establish the communication link via the communication interface with the remote wireless device having the communication link characteristics;

transmit the output video stream to the remote wireless device over the communication link having the communication link characteristics;

determine an altered data throughput requirement to transport the output video stream over the communication link to the remote wireless device;

determine altered communication link characteristics in response to the altered data throughput requirement and establish an altered communication link via the communication interface with the remote wireless device having the altered communication link characteristics;

determine second video processing parameters based upon the altered communication link characteristics;

process the video stream based upon the second video processing parameters to generate a second output video stream; and transmit the second output video stream to the remote wireless device over the altered communication link having the altered communication link characteristics.

2. The video processing system of claim 1, wherein:
processing of the video data includes altering a frame rate of the incoming video stream to produce the output video stream.

3. The video processing system of claim 2, wherein altering the frame rate of the incoming video stream to produce the output video stream includes altering Program Clock References (PCRs) of video frames of the incoming video stream to produce video frames of the output video stream.

4. The video processing system of claim 1, wherein:
processing of the video data to produce the output video stream includes altering a resolution of video frames of the incoming video stream to produce video frames of the output video stream.

5. The video processing system of claim 1, wherein:
processing of the video data to produce the output video stream includes altering a color resolution of video frames of the incoming video stream to produce video frames of the output video stream.

6. The video processing system of claim 1, wherein:
the incoming video stream includes color content; and
processing of the video data includes removing color content of video frames of the incoming video stream to produce video frames of the output video stream.

7. The video processing system of claim 1, wherein:
processing of the video data includes altering pixel density within one of the plurality of areas of interest in each video frame of the plurality of video frames of the incoming video stream.

8. The video processing system of claim 1, wherein least one operating parameter regarding a remote wireless device comprises:

a buffer fullness of a decoder of the remote wireless device;

a remaining battery life of the remote wireless device;

a serviced display resolution of a display of the remote wireless device;

a serviced color resolution of a display of the remote wireless device;

an indication of data throughput currently allocated to the remote wireless device by a servicing wireless network; and a decoding error feedback parameter relating to a decoder of the remote wireless device.

9. The video processing system of claim 1, wherein the video processing system is a server computer.

10. The video processing system of claim 9, wherein the communications interface couples the video processing system directly to the video source.

11. The video processing system of claim 1, wherein the video processing system forms a part of a wireless access device that wirelessly communicates with the remote wireless device.

12. The video processing system of claim 1, wherein the communication link characteristics include one or more of the following: slot assignment parameters; channel assignment parameters; transmit power allocation parameters; beam forming parameters; Multi-Input-Multi-Output (MIMO) parameters; modulation parameters; and coding parameters; and wherein the altered communication link characteristics include one or more of the following: slot assignment parameters; channel assignment parameters; transmit power allocation parameters; beam forming parameters; Multi-Input-Multi-Output (MIMO) parameters; modulation parameters; and coding parameters.

13. A method for processing video data comprising:

receiving video data from a video source;

receiving a plurality of operating parameters regarding a remote wireless device, wherein the plurality of operating parameters includes: a buffer fullness of a decoder of the remote wireless device; a remaining battery life of the remote wireless device; a serviced display resolution of a display of the remote wireless device; and a serviced color resolution of a display of the remote wireless device;

determining video processing parameters based upon the video data and the plurality of operating parameters;

processing the video data based upon the video processing parameters to produce an output video stream;

determine a data throughput requirement to transport the output video stream over a communication link to the remote wireless device;

determine communication link characteristics in response to the data throughput requirement and establish the communication link with the remote wireless device having the communication link characteristics;

transmit the output video stream to the remote wireless device over the communication link having the communication link characteristics;
determine an altered data throughput requirement to transport the output video stream over the communication link to the remote wireless device;
determine altered communication link characteristics in response to the altered data throughput requirement and establish an altered communication link with the remote wireless device having the altered communication link characteristics; and
transmit the output video stream to the remote wireless device over the altered communication link having the altered communication link characteristics.

14. The method of claim 13, wherein:
the video data is an incoming video stream; and
processing of the video data includes altering a frame rate of the incoming video stream to produce the output video stream.

15. The method of claim 14, wherein altering the frame rate of the incoming video stream to produce the output video stream includes altering Program Clock References (PCRs) of video frames of the incoming video stream to produce video frames of the output video stream.

16. The method of claim 13, wherein:
the video data is an incoming video stream; and
processing of the video data to produce the output video stream includes altering a resolution of video frames of the incoming video stream to produce video frames of the output video stream.

17. The method of claim 13, wherein:
the video data is an incoming video stream; and
processing of the video data to produce the output video stream includes altering a color resolution of video frames of the video stream to produce video frames of the output video stream.

18. The method of claim 13, wherein:
the video data is an incoming video stream having color content; and
processing of the video data includes removing color content of video frames of the incoming video stream to produce video frames of the output video stream.

19. The method of claim 13, wherein:
the video data is an incoming video stream; and
processing of the video data includes altering pixel density within an area of interest of video frames of the incoming video stream to produce the output video stream.

20. The method of claim 13, wherein:
the video data is an incoming video stream; and
processing of the video data includes cropping video information outside of an area of interest of video frames of the incoming video stream to produce the output video stream.

21. The method of claim 13, wherein the plurality of operating parameters further includes:
an indication of data throughput currently allocated to the remote wireless device by a servicing wireless network; and
a decoding error feedback parameter relating to a decoder of the remote wireless device.

* * * * *

UNITED STATES PATENT AND TRADEMARK OFFICE
CERTIFICATE OF CORRECTION

PATENT NO. : 8,209,733 B2  
APPLICATION NO. : 12/172088  
DATED : June 26, 2012  
INVENTOR(S) : Thomas J. Quigley et al.

Page 1 of 1

It is certified that error appears in the above-identified patent and that said Letters Patent is hereby corrected as shown below:

In the Claims:

Col. 22, line 6, in claim 8: replace "wherein least" with --wherein at least--

Signed and Sealed this  
Third Day of September, 2013

Teresa Stanek Rea  
*Acting Director of the United States Patent and Trademark Office*